(12) United States Patent
Watanabe et al.

(10) Patent No.: US 6,271,760 B1
(45) Date of Patent: Aug. 7, 2001

(54) HUMAN BODY SENSOR FOR SEAT

(75) Inventors: Yoshiaki Watanabe; Hiroyuki Ogino; Masahiro Inoue; Kenji Yoshinaga; Takashi Iwasa, all of Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/269,993
(22) PCT Filed: Oct. 4, 1996
(86) PCT No.: PCT/JP96/02913
 § 371 Date: Apr. 5, 1999
 § 102(e) Date: Apr. 5, 1999
(87) PCT Pub. No.: WO98/14096
 PCT Pub. Date: Apr. 9, 1998

(30) Foreign Application Priority Data

Apr. 11, 1995 (JP) .................................................. 7-85292
Jun. 30, 1995 (JP) ................................................. 7-165088

(51) Int. Cl.$^7$ ................................................. G08B 21/00
(52) U.S. Cl. ........................... 340/667; 340/665; 340/668
(58) Field of Search .................................... 340/665, 666, 340/667, 668, 457.1, 425.5, 438; 280/732, 735; 180/273, 268; 600/587, 595

(56) References Cited

U.S. PATENT DOCUMENTS

| 4,295,133 | * | 10/1981 | Vance | 340/667 |
| 4,361,741 | * | 11/1982 | Leskiverc et al. | 340/667 |
| 5,054,145 | * | 10/1991 | Tsuchiya et al. | 5/655.5 |
| 5,232,243 | * | 8/1993 | Blackburn, et al. | 280/732 |
| 5,404,128 | * | 4/1995 | Ogino et al. | 340/667 |
| 5,479,939 | * | 1/1996 | Ogino | 600/595 |
| 5,724,990 | * | 3/1998 | Ogino | 600/587 |

FOREIGN PATENT DOCUMENTS

| 42 37 072 | 12/1993 | (DE) . |
| 3-16550 | 2/1991 | (JP) . |
| 3-86859 | 9/1991 | (JP) . |
| 5-253037 | 10/1993 | (JP) . |

OTHER PUBLICATIONS

Japanese language search report for Int'l Appln No. PC/JP96/02913 dated Dec. 17, 1996.
English translation of Japanese language search report.

* cited by examiner

Primary Examiner—Van T. Trieu
(74) Attorney, Agent, or Firm—Ratner & Prestia

(57) ABSTRACT

A human body detector for a seat which does not deteriorate comfort of sitting even when it is disposed on the seat, has a high sensitivity and can be easily fitted to the seat. Vibration detection means (5) is disposed in such a manner that even when a person is seated, the means (5) comes into contact with the bottom surface of a seat pad (16) of a seat (19) and accordingly the person does not feel the means (5). According to this construction, the human body does not easily feel the means (5) by the provision of the seat pad (16), the existence of the vibration detection means (5) is hardly felt even when the hardness and the shape are changed, and various measures for improving the sensitivity of the vibration detection means (5) can be taken. The vibration detection means (5) may be merely bonded to the seat pad (16) or may be fixed to a seat spring (17) or a seat frame (18), and can be fitted more easily to the seat (19) than when it is disposed below a surface cloth (15) of the seat (19).

29 Claims, 18 Drawing Sheets

HUMAN BODY SENSOR FOR SEAT

TECHNICAL FIELD

The present invention relates to a human body detector for seat and vibration detection means for detecting the presence or absence of human body on a seat by vibration.

BACKGROUND ART

Recently, enhancement of comfort and safety for the human is demanded, and in particular the method of controlling individually the environments of a limited space in which a person exists is capable of obtaining high effects in the aspects of comfort and safety, and development of various devices and techniques has been promoted. In addition, if the device for controlling the environments of a limited space can be operated only while a person is present in the space, it is effective for saving the energy and reducing consumption of the device, and hence it is attempted to detect the presence of man in a space in various methods.

A conventional example of this kind of human body detector for seat is described. For example, DE. PAT. No. 4237072, using a film type pressure sensor 1 as shown in FIG. 1, discloses a constitution of a human body detector for seat by disposing it beneath a surface cloth of a seat. The film type pressure sensor 1 is formed by disposing plural pressure sensitive resistant elements 3 mutually connected parallel electrically by a conductor 2 on a base film, and the conductor 2 is connected to two terminals at an end 4, and by measuring the resistance value between the terminals, the pressure applied to the film type pressure sensor 1 can be detected. That is, according to this constitution, when a human body is seated on the seat, the pressure by the body weight is applied to any one of the plural pressure sensitive resistant elements 3, and the resistance value of the pressure sensitive resistant element 3 loaded with pressure is lowered, and the resistance value between the two terminals at the end 4 showing the entire resistance value is lowered, and by detecting this drop of resistance value, the presence of the human body on the seat is detected.

In such constitution, however, if an object is put on the seat, the resistance value of the pressure sensitive resistant element 3 is lowered by the weight of the object, and a wrong detection may result in. Or, when the film type pressure sensor 1 is installed at a position remote from the surface cloth of the seat, the pressure applied by the human body is dispersed as departing from the surface cloth, and it is required to raise the sensitivity of the pressure sensitive resistant element 3, and if installed closely to the surface cloth in order to avoid this, the existence of itself is felt by the human body, and the comfort of sitting is impaired, and hence it was difficult to solve the contradictory problems of sensitivity and comfort. Still more, when installing the film type pressure sensor 1 in the seat, if a pressure is applied to a part of the pressure sensitive resistant element 3 due to deviation from specified position or other reason, the resistance of the pressure sensitive resistant element 3 is lowered and it may be judged that the human body is always present, and to avoid this, very careful installation on the seat is required.

Incidentally, in U.S. Pat. No. 5,404,128, as shown in FIG. 2, using vibration detecting means 5, by installing it in the seat, converting the vibration due to move of human body or breathing into an electric signal, and processing this signal in signal processing means 6, it is judged whether a human body is present or not on the seat. Herein, as vibration detecting means 5, a film type piezoelectric element is used, and by detecting fine vibrations due to respiration, heart beat or other physiological phenomenon of the human body by it, it is possible to distinguish from the case in which other object not making such vibration is placed, so that the presence of human body on the seat is securely judged. In this prior art, this human body detector is installed in the seat of a passenger car, and when installed in such vibrating environments, when a person is seated on the seat, together with the vibration of the excited vibration frequency, the vibration component of the natural frequency of the human body appears largely, and this vibration component does not appear or the level is low if appearing in the case an object is placed on the seat or there is nothing, so that the difference is evident between the presence and absence of human body. Therefore, providing the signal processing means 6 with two filters 7a, 7b, the filter characteristics are set so that the first filter 7a filters the signal component attributable to the natural vibration of the human body, and that the second filter 7b filters the signal component due to vibration of the vehicle, and, using these outputs, judging means 10 takes out and judges the vibration component of the human body from the vibration of the vehicle, so that only the presence of human body sitting on the seat can be securely judged. Herein, meanwhile, the outputs of the first and second filters 7a, 7b are respectively amplified by the amplifying means 8a, 8b, and smoothed by smoothing means 9a, 9b, and issued to judging means 10, while the information of presence or absence of human body in the seat judged by the judging means 10 is issued to control means 11 of automobile, and the control means 11 controls traveling means 12, seat control means 13, or alarm means 14 on the basis of the information of presence or absence of human body.

In such case, however, the contradictory problems of sensitivity and comfort of sitting of the vibration detecting means 5 have not been solved yet. In the two foregoing embodiments, incidentally, when the film type pressure sensor 1 or vibration detecting means 5 is installed near the surface cloth, if water is spilled or lit cigarette is dropped on the seat by mistake, the film type pressure sensor 1 or vibration detecting means 5 is easily affected by water or heat, and specified performance cannot be exhibited.

DISCLOSURE OF THE INVENTION

The invention is devised to solve the above problems, and it is a first object thereof to present a human body detector for seat not deteriorating comfort of sitting even when it is disposed on the seat.

It is a second object thereof to present a human body detector for seat rarely causing troubles.

It is a third object thereof to present a human body detector for seat high in sensitivity.

It is a fourth object thereof to present a human body detector for seat easy to dispose on the seat.

To achieve the first and second objects, the human body detector for seat of the invention comprises vibration detection means for detecting vibrations of a human body seated on a seat, signal processing means for processing the output of the vibration detection means, and judging means for judging presence or absence of human body on the seat by the output of the signal processing means, in which the vibration detection means is disposed in part of the seat so that the human body seated on the seat may not feel presence of the vibration detection means.

Also to achieve the first object, according to the human body detector for seat of the invention, the signal processing means has plural filter means for dividing the output signal of the vibration detection means into plural signals differing in frequency components and issuing.

Also to achieve the first and fourth objects, according to the human body detector for seat of the invention, the seat has a seat spring, and the vibration detection means is disposed as being fixed to the seat spring.

Also to achieve the first and fourth objects, according to the human body detector for seat of the invention, the seat has a seal pad, and the vibration detection means is disposed in contact with the bottom of the seat pad.

Also to achieve the third object, according to the human body detector for seat of the invention, the seat has a seat pad and a seat frame for holding the seat pad, the vibration detection means is disposed in a band element installed beneath the seat pad, and the band element is coupled to the seat frame, so that a tension is applied depending on the load from the seat pad.

Also to achieve the third object, according to the human body detector for seat of the invention, the seat has a seat pad and a seat spring for holding the seat pad, the vibration detection means is disposed in a band form installed beneath the seat pad, and the band form is coupled to the seat spring, so that a tension is applied depending on the load from the seat pad.

Also to achieve the third object, according to the human body detector for seat of the invention, the seat has a seat frame for holding the seat pad, the vibration detection means comprises a piezoelectric element for generating an electric charge by external force and a tension applying unit for applying a tension to the piezoelectric element, and the tension applying unit couples between the piezoelectric element and the seat frame, so that a tension depending on the load from the seat pad is applied to the piezoelectric element.

Also to achieve the third object, according to the human body detector for seat of the invention, the seat has a seat spring for holding the seat pad, the vibration detection means comprises a piezoelectric element for generating an electric charge by external force and a tension applying unit for applying a tension to the piezoelectric element, and the tension applying unit couples between the piezoelectric element and the seat spring, so that a tension depending on the load from the seat pad is applied to the piezoelectric element.

Also to achieve the second object, according to the human body detector for seat of the invention, the vibration detection means includes a tension controller for limiting the tension applied to the piezoelectric element.

Also to achieve the second object, according to the human body detector for seat of the invention, in which the tension controller is composed of a member longer in dimension than the piezoelectric element and smaller in extension than the piezoelectric element, and its both ends are coupled to both ends of the piezoelectric element.

Also to achieve the second object, according to the human body detector for seat of the invention, the tension controller is composed of an elastic member for coupling the end of the piezoelectric element and the seat frame.

Also to achieve the second object, according to the human body detector for seat of the invention, the tension controller is composed of an elastic member for coupling the end of the piezoelectric element and the seat spring.

Also to achieve the first, third and fourth objects, according to the human body detector for seat of the invention, the vibration detection means is composed of a vibration detector for issuing an electric signal depending on the applied vibration, and a buffer for absorbing the applied vibration, and the vibration detector is held between the bottom of the seat pad and the buffer.

Also to achieve the third and fourth objects, according to the human body detector for seat of the invention, the vibration detector is fixed on the surface of the buffer, and the side for fixing the vibration detector of the buffer is fixed to the bottom of the seat pad together with the vibration detector.

Also to achieve the third and fourth objects, according to the human body detector for seat of the invention, the seat has a seat frame for holding the seat pad, the vibration detector is fixed to the surface of the buffer, and the side for fixing the vibration detector of the buffer is disposed so that the vibration detector may contact with the seat pad, and is also disposed on the seat frame.

Also to achieve the third and fourth objects, according to the human body detector for seat of the invention, the seat has a seat spring for holding the seat pad, the vibration detector is fixed to the surface of the buffer, and the side for fixing the vibration detector of the buffer is disposed so that the vibration detector may contact with the seat pad of the seat, and is also disposed on the seat spring.

Also to achieve the third object, according to the human body detector for seat of the invention, the buffer has a space for allowing the vibration detector fixed on its surface to vibrate.

Also to achieve the third object, according to the human body detector for seat of the invention, the space is a recess formed at one side of the buffer, the vibration detector is disposed at a position facing the recess at the opposite side of the recess of the buffer, and the side for disposing the vibration detector of the buffer is disposed in contact with the bottom of the seat pad of the seat together with the vibration detector.

Also to achieve the third object, according to the human body detector for seat of the invention, the space is a through-hole provided in the buffer, the vibration detector is disposed so as to cover the through-hole of the buffer, and the side for disposing the vibration detector of the buffer is disposed in contact with the bottom of the seat pad of the seat together with the vibration detector.

Also to achieve the second and third objects, according to the human body detector for seat of the invention, the space includes plural spaces.

Also to achieve the third object, according to the human body detector for seat of the invention, the buffer is not uniform in structure, but is constituted so that the side for contacting with the vibration detection means is more likely to absorb the vibration than its opposite side.

Also to achieve the third object, according to the human body detector for seat of the invention, the buffer is composed of at least two different materials, and the side for contacting with the vibration detection means is composed of a material more likely to absorb the vibration than the opposite side.

Also to achieve the third object, according to the human body detector for seat of the invention, the buffer is composed of a foamed material, and the side for contacting with the vibration detection means is smaller in the foam density than the opposite side.

Also to achieve the third object, according to the human body detector for seat of the invention, the buffer is composed of materials different in hardness, and the side for contacting with the vibration detector is higher in hardness than the opposite side.

Having the aforesaid constitutions, the human body detector for seat of the invention brings about the following actions.

That is, in the human body detector for seat of the invention, when a human body is seated on the seat, the vibration of the human body is transmitted to vibration detection means disposed in part of the seat of which existence is not felt by the seated human body, and the vibration detection means generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means disposed in part of the seat of which existence is not felt by the seated human body, and the vibration detection means generates a signal depending on the magnitude of the transmitted vibration, and this signal is issued to signal processing means. The signal processing means processes the output signal of the vibration detection means by dividing into plural signals differing in frequency component by plural filters provided inside, and issues to judging means, and the judging means judges presence or absence of the human body on the seat according to the plural outputs of the signal processing means.

Also, in the human body detector for seat of the invention, when a human body is seated on the seat, the vibration of the human body is transmitted to vibration detection means fixed to a seat spring of the seat of which existence is not felt by the seated human body, and the vibration detection means generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means disposed in contact with the bottom of a seat pad of the seat of which existence is not felt by the seated human body, and the vibration detection means generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means.

Also, in the human body detector for seat of the invention, when a human body is seated on the seat, a tension depending on the load of the human body is applied and the vibration of the human body is transmitted to a band element disposed in contact with the bottom of a seat pad of the seat of which existence is not felt by the seated human body, and coupled to a seat frame so as to generate a tension depending on the load from the seat pad, and this vibration is transmitted to vibration detection means disposed in the band element, and the vibration detection means generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means.

Also, in the human body detector for seat of the invention, when a human body is seated on the seat, a tension depending on the load of the human body is applied and the vibration of the human body is transmitted to a band element disposed in contact with the bottom of a seat pad of the seat of which existence is not felt by the seated human body, and coupled to a seat spring so as to generate a tension depending on the load from the seat pad, and this vibration is transmitted to vibration detection means disposed in the band element, and the vibration detection means generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means.

Also, in the human body detector for seat of the invention, when a human body is seated on the seat, a piezoelectric element disposed in contact with the bottom of a seat pad of which existence is not felt by the seated human body is applied with a tension depending on the load from the seat pad by means of a tension applying unit coupling the seat frame of the seat and the piezoelectric element, and also the vibration of the human body is transmitted, and the piezoelectric element generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means.

Also, in the human body detector for seat of the invention, when a human body is seated on the seat, a piezoelectric element disposed in contact with the bottom of a seat pad of which existence is not felt by the seated human body is applied with a tension depending on the load from the seat pad by means of a tension applying unit coupling the seat spring of the seat and the piezoelectric element, and also the vibration of the human body is transmitted, and the piezoelectric element generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means.

Also, in the human body detector for seat of the invention, when a human body is seated on the seat, a piezoelectric element disposed in contact with a seat pad of which existence is not felt by the seated human body is applied with a tension depending on the load from the seat pad by means of a tension applying unit coupling the seat frame or seat spring of the seat and the piezoelectric element, and also the vibration of the human body is transmitted, and the piezoelectric element generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means. On the other hand, as for the excessive tension applied to the piezoelectric element due to impact when seating, a tension controller limits the tension applied to the piezoelectric element so that a tension over a predetermined value may not be applied to the piezoelectric element.

Also, in the human body detector for seat of the invention, when a human body is seated on the seat, a piezoelectric element disposed in contact with the bottom of a seat pad of which existence is not felt by the seated human body is applied with a tension depending on the load from the seat pad by means of a tension applying unit coupling the seat frame or seat spring of the seat and the piezoelectric element, and also the vibration of the human body is transmitted, and the piezoelectric element generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means. On the other hand, as for the excessive tension applied to the piezoelectric element due to impact when seating, a tension controller composed of a member longer in dimension than the piezoelectric element and smaller in extension than the piezoelectric element, with both ends fixed to the both ends of the piezoelectric element limits the tension applied to the piezoelectric element so that a tension over a predetermined value may not be applied to the piezoelectric element.

Also, in the human body detector for seat of the invention, when a human body is seated on the seat, a piezoelectric element disposed in contact with the bottom of a seat pad of which existence is not felt by the seated human body is applied with a tension depending on the load from the seat pad by means of a tension applying unit coupling the seat frame of the seat and the piezoelectric element, and also the vibration of the human body is transmitted, and the piezoelectric element generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means. On the other hand, as for the excessive tension applied to the piezoelectric element due to impact when seating, a tension controller composed of an elastic member for coupling the ends of the piezoelectric element and the seat frame limits the tension applied to the piezoelectric element so that a tension over a predetermined value may not be applied to the piezoelectric element.

Also, in the human body detector for seat of the invention, when a human body is seated on the seat, a piezoelectric element disposed in contact with the bottom of a seat pad of which existence is not felt by the seated human body is applied with a tension depending on the load from the seat pad by means of a tension applying unit coupling the seat spring of the seat and the piezoelectric element, and also the vibration of the human body is transmitted, and the piezoelectric element generates a signal depending on the magnitude of the transmitted vibration, and this signal is issued to signal processing means. The signal processing means processes the output signal of the vibration detection means as specified and issues to judging means, and the judging means judges presence or absence of the human body on the seat according to the output of the signal processing means. On the other hand, as for the excessive tension applied to the piezoelectric element due to impact when seating, a tension controller composed of an elastic member for coupling the ends of the piezoelectric element and the seat spring limits the tension applied to the piezoelectric element so that a tension over a predetermined value may not be applied to the piezoelectric element.

Also, in the human body detector for seat of the invention, when a human body is seated on the seat, the vibration of the human body is transmitted to vibration detection means with its vibration detector held between a buffer and the bottom of the seat pad of the seat of which existence is not felt by the seated human body. To the vibration detection means, on the other hand, unnecessary vibration components other than the human body transmitted from a seat frame for supporting the seat pad and others are also transmitted, and these vibration components are absorbed by the buffer of the vibration detection means, and the attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having the side for fixing its vibration detector of a buffer fitted to the bottom of a seat pad of the seat together with the vibration detector of which existence is not felt by the seated human body. To the vibration detection means, on the other hand, unnecessary vibration components other than the human body transmitted from a seat frame for supporting the seat pad and others are also transmitted, and these vibration components are absorbed by the buffer of the vibration detection means, and the attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having the side for fixing its vibration detector of a buffer disposed so as to contact with the bottom of a seat pad of the seat together with the vibration detector, and fitted to a seat frame for holding the seat pad of which existence is not felt by the seated human body. To the vibration detection means, on the other hand, unnecessary vibration components other than the human body transmitted from the seat frame and others are also transmitted, and these vibration components are absorbed by the buffer of the vibration detection means, and the attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having the side for fixing its vibration detector of a buffer disposed so as to contact with the bottom of a seat pad of the seat together with the vibration detector, and fitted to a seat spring for supporting the seat pad of which existence is not felt by the seated human body. To the vibration detection means, on the other hand, unnecessary vibration components other than the human body transmitted from the seat spring and others are also transmitted, and these vibration components are absorbed by the buffer of the vibration detection means, and the attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having its vibration detector held between a buffer and the bottom of a seat pad of the seat of which existence is not felt by the seated human body, but since the buffer has a space in vibrating area of the vibration detector, the free vibration by the vibration from the seat pad of the vibration detector is not impeded, and a large vibration is transmitted. To the vibration detection means, on the other hand, unnecessary vibration components other than the human body transmitted from a seat frame for supporting the seat pad and others are also transmitted, and these vibration components are absorbed and attenuated by the buffer of the vibration detection means, and since the buffer also has the space in the vibrating area of the vibration detector, components directly transmitted to the vibration detector are decreased, and a further attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having its vibration detector held between a buffer and the bottom of a seat pad of the seat of which existence is not felt by the seated human body, but since the buffer has a recess in facing areas of the vibration detector at the opposite side to the side for fixing the vibration detector, the free vibration by the vibration from the seat pad of the vibration detector is not impeded, and a large vibration is transmitted. To the vibration detection means, on the other hand, unnecessary vibration components other than the human body transmitted from a seat frame for supporting the seat pad and others are also transmitted, and these vibration components are absorbed and attenuated by the buffer of the vibration detection means, and since the buffer also has the recess in facing areas of the vibration detector at the side for fixing the vibration detector and the opposite side, components directly transmitted to the vibration detector are decreased, and a further attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having its vibration detector held between a buffer and the bottom of a seat pad of the seat of which existence is not felt by the seated human body, but since the buffer has a through-hole and the vibration detector is disposed so as to cover the through-hole, the free vibration by the vibration from the seat pad of the vibration detector is not impeded, and a large vibration is transmitted. To the vibration detection means, on the other hand, unnecessary vibration components other than the human body transmitted from a seat frame for supporting the seat pad and others are also transmitted, and these vibration components are absorbed and attenuated by the buffer of the vibration detection means, and since the buffer also has the through-hole and the vibration detector is disposed so as to cover the through-hole, components directly transmitted to the vibration detector are decreased, and a further attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having its vibration detector held between a buffer and the bottom of a seat pad of the seat of which existence is not felt by the seated human body, but since the buffer has plural spaces in vibrating area of the vibration detector, the free vibration by the vibration from the seat pad of the vibration detector is not impeded, and a large vibration is transmitted. To the vibration detection means, on the other hand, unnecessary vibration components other than the human body transmitted from a seat frame for supporting the seat pad and others are also transmitted, and these vibration components are absorbed and attenuated by the buffer of the vibration detection means, and since the buffer also has the plural spaces in vibrating area of the vibration detector, components directly transmitted to the vibration detector are further decreased, and an extremely attenuated vibration is transmitted to the vibration detector. Meanwhile, between the plural spaces, there is the thickness of the buffer, and it prevents the vibration detector from peeling off the seat pad, so that the vibration of the human body from the seat pad is stably transmitted to the vibration detector for a long period. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having its vibration detector held between a buffer and the bottom of a seat pad of the seat of which existence is not felt by the seated human body. To the vibration detection means, on the other hand, unnecessary vibration components other than the human body transmitted from a seat frame for supporting the seat pad and others are also transmitted, and these vibration components are absorbed and attenuated by the buffer of the vibration detection means, and since the side of the buffer contacting with the vibration detector is more likely to absorb the vibration than the opposite side, components directly transmitted to the vibration detector are further decreased, and an extremely attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having its vibration detector held between a buffer and the bottom of a seat pad of the seat of which existence is not felt by the seated human body. To the vibration detection means, on the other hand, unnecessary vibration components other than the human body transmitted from a seat frame for supporting the seat pad and others are also transmitted, and these vibration components are absorbed and attenuated by the buffer of the vibration detection means, and since the buffer is composed of at least two or more different materials, and the side for contacting with the vibration detector is composed of a material more likely to absorb the vibration than the opposite side, components directly transmitted to the vibration detector are further decreased, and an extremely attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having its vibration detector held between a buffer and the bottom of a seat pad of the seat of which existence is not felt by the seated human body. To the vibration detection means, on the other hand, unnecessary vibration components other than the human body transmitted from a seat frame for supporting the seat pad and others are also transmitted, and these vibration components are absorbed and attenuated by the buffer of the vibration detection means, and since the buffer is composed of a foamed material, and the side for contacting with the vibration detection means is smaller in foam density than the opposite side, components directly transmitted to the vibration detector are further decreased, and an extremely attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

Also, in the human body detector for seat of the invention, when a human body is seated on the seat, the vibration of the human body is transmitted to vibration detection means having its vibration detector held between a buffer and the bottom of a seat pad of the seat of which existence is not felt by the seated human body. To the vibration detection means, on the other hand, unnecessary vibration components other than the human body transmitted from a seat frame for supporting the seat pad and others are also transmitted, and these vibration components are absorbed and attenuated by the buffer of the vibration detection means, and since the buffer is composed of materials differing in hardness, and the side for contacting with the vibration detector is higher in hardness than the opposite side, components directly transmitted to the vibration detector are further decreased, and an extremely attenuated vibration is transmitted to the vibration detector. The vibration detection means issues a signal generated by the vibration detector depending on the magnitude of these transmitted vibrations to signal processing means. The signal processing means processes the output signal of the vibration detector as specified and issues to judging means, and the judging means judges presence or absence of the human body on the seat according to the output of the signal processing means.

BEST MODE OF CARRYING OUT THE INVENTION

Preferred embodiments of the invention are descried below while referring to FIG. 3 through FIG. 19.

Figure 1:
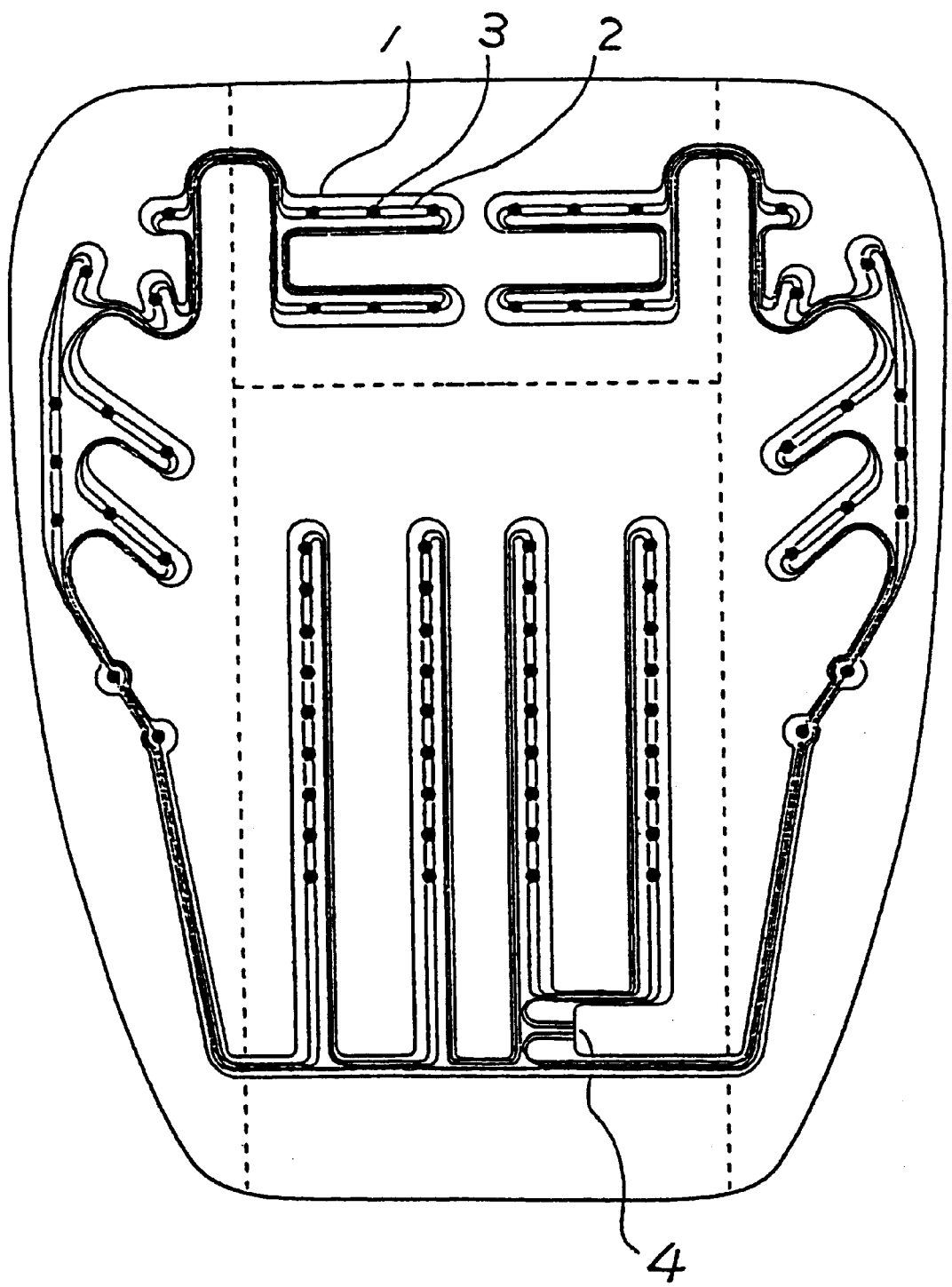
FIG. 1 is a plan view of appearance of a film type pressure sensor of a conventional human body detector.
Figure 2:
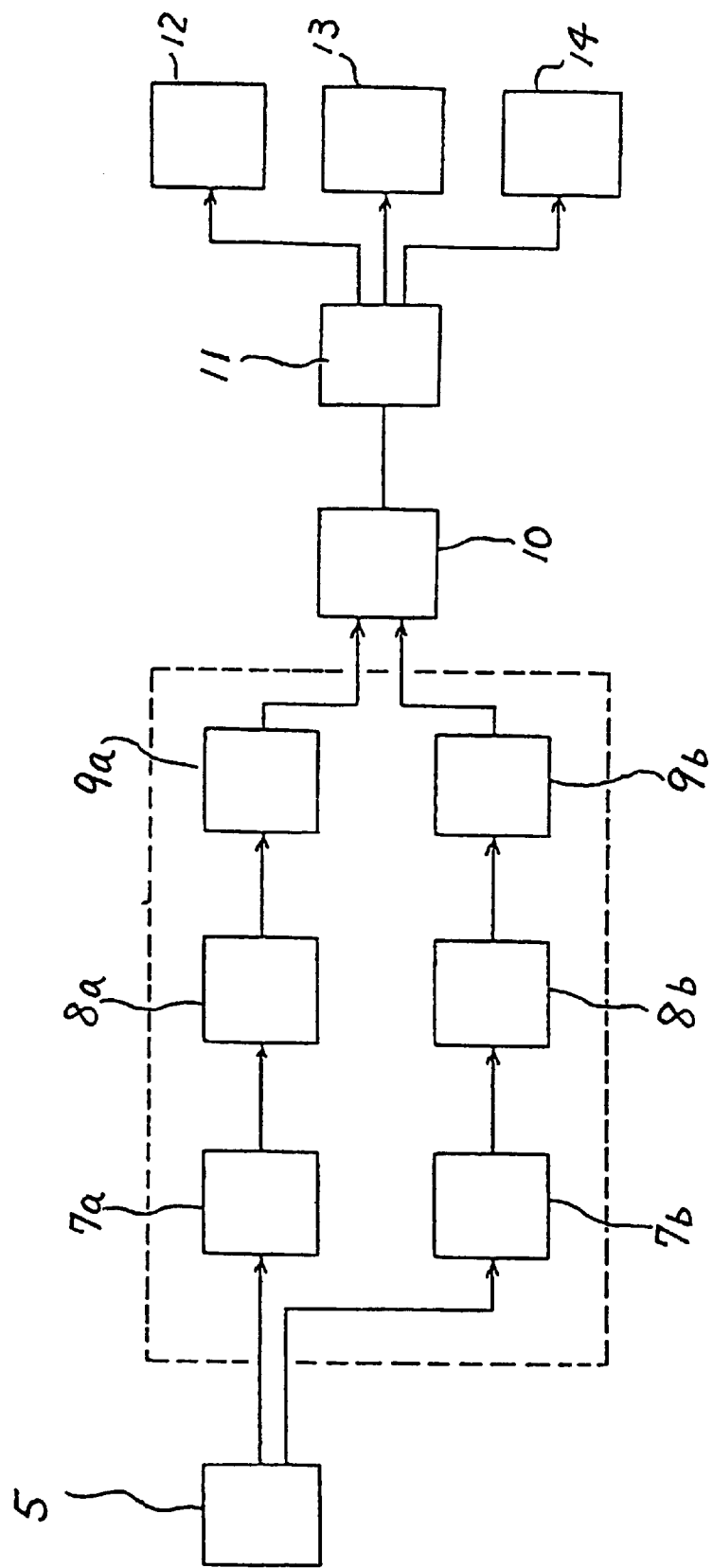
FIG. 2 is a block diagram of the same human body detector.
Figure 3:
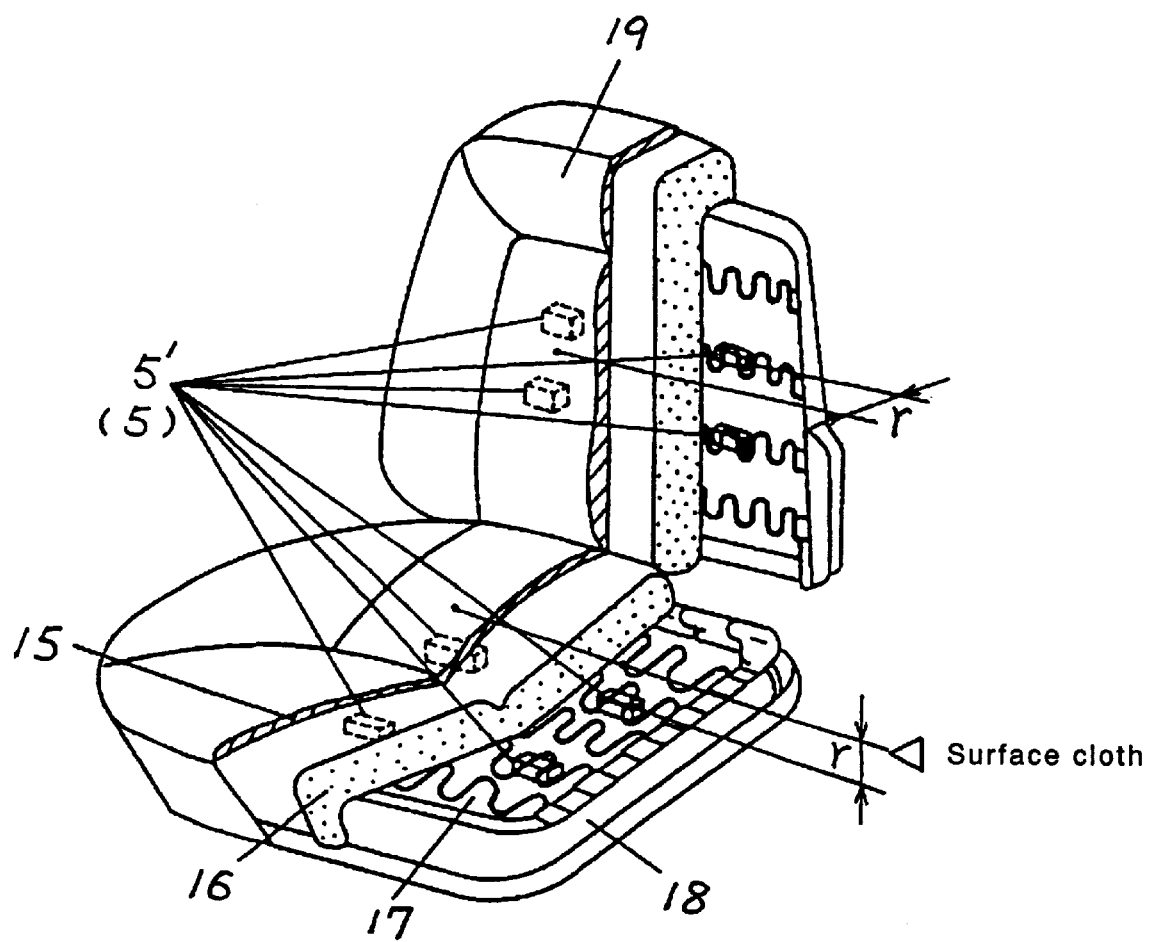
FIG. 3 is a perspective sectional view of a seat mounting a human body detector for seat in a first embodiment of the invention.
Figure 4:
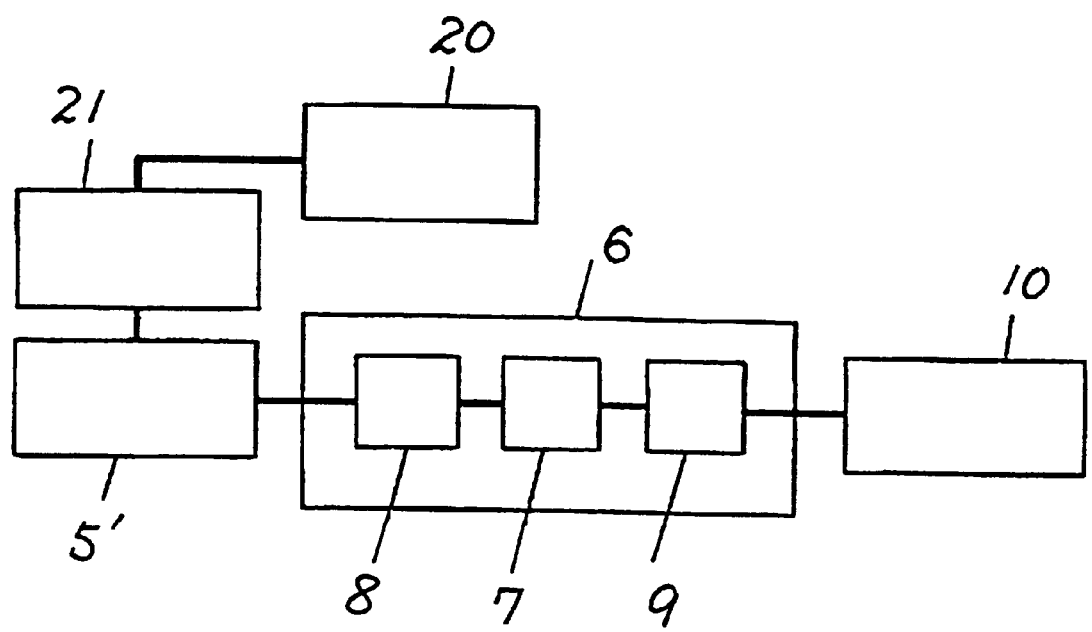
FIG. 4 is a block diagram of the same detector.

FIG. 3 is a perspective sectional view of a seat mounting a human body detector for seat in a first embodiment of the invention, and FIG. 4 is a block diagram of the human body detector for seat of the embodiment. In the drawings, reference numeral 5' is an acceleration sensor used as vibration detection means 5, 15 is a surface cloth of a seat 19, 16 is a seat pad, 17 is a seat spring, 18 is a seat frame, 20 is a power source, 21 is a resistance circuit, 6 is signal processing means, and 10 is judging means. Herein, the signal processing means 6 is composed of an amplifier 8, a filter 7, and smoothing circuit 9.

In this embodiment, the vibration detection means 5 is the acceleration sensor 5' for distorting a resistant element by the acceleration caused by vibration, and converting this distortion into an electric signal as a resistance change, and this acceleration sensor 5' is fixed on the seat spring 17 for composing the seat 19 apart from the contact surface of the seat 19 and the human body by more than a specified distance r through the surface cloth 15 and seat pad 16. Herein, r is the distance at which the existence of the acceleration sensor 5' may not be felt by the human body seated on the seat 19, and it is longer (larger) as the hardness of the casing of the acceleration sensor 5' is higher and the seat pad 16 is softer. In the embodiment, it is fixed on the seat spring 17 which is located beneath the seat pad 16, and since the seat spring 17 is generally composed of metallic wires, the seat 19 is already composed so that it may not be felt by the human body seated on this seat spring 17, and it has a similar hardness and an appropriate shape without protrusion, and hence when it is fixed on the seat spring 17, it is not felt by the human body, so that it can be disposed at this fixing position without deteriorating the comfort of sitting.

Figure 5:
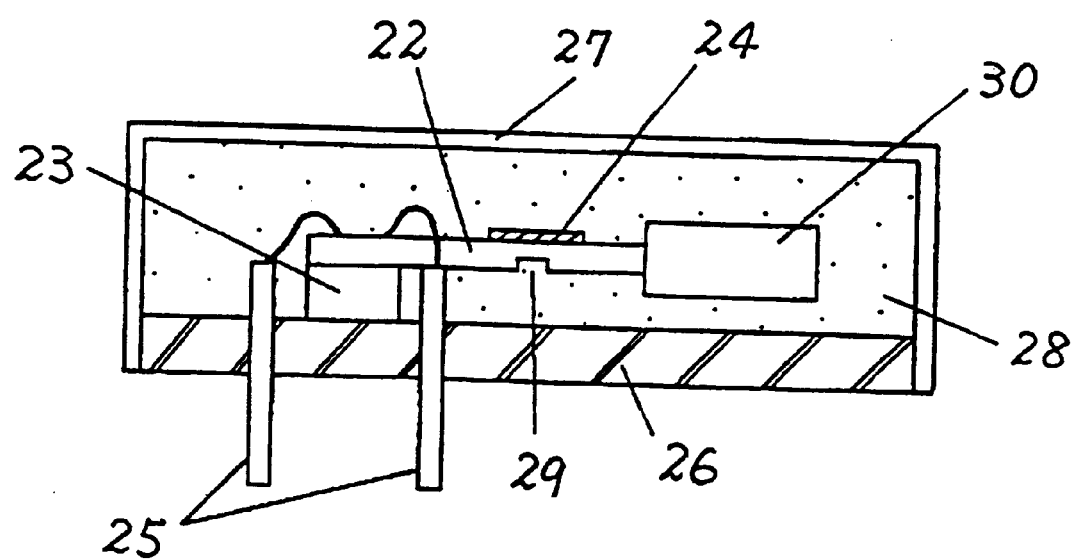
FIG. 5 is a sectional view of an acceleration sensor of the detector.

A sectional view of the acceleration sensor 5' is shown in FIG. 5. As shown in the drawing, the acceleration sensor 5' is composed of a beam 22, a support stand 23 for supporting the beam 22, a resistant element 24 disposed on the beam 22, terminals 25 electrically connected to both ends of the resistant element 24, a base 26 as the substrate of these structures, a case 27 for protecting the structures, and a liquid filler 28 for filling up the space in the case 27. In this embodiment, such acceleration sensors 5' are disposed in a total of eight positions, that is, four positions at the seat side and four positions at the back side of the seat spring 17 as shown in FIG. 3 for detecting the vibration of the human body. Meanwhile, if the acceleration sensors 5' are disposed at the back side only or at the back rest side only for detecting the vibration of the human body, the required performance can be exhibited.

In this constitution, the operation is described below. When a human body is seated on the seat 19, its vibration is transmitted to vibrate the seat spring 17 through the surface cloth 15 of the seat 19 and the seat pad 16, and this vibration causes to vibrate the acceleration sensor 5' fixed on the seat spring 17, and receiving the acceleration of this vibration, the beam 22 in the acceleration sensor 5' amplifies the vibration the sensor has received, and it is transmitted to the resistant element 24 fixed on the surface of the beam 22, so that the resistance of the resistant element 24 is changed by the distortion caused by the vibration of the beam 22. If the human body is at rest, the human body moves slightly by respiration or heart beat, and the vibration by such bodily motion also causes to change the resistance of the resistant element 24 through the same route. The resistant element 24 is preliminarily applied with a voltage from the power source 20 through the resistance circuit 21, and when the resistance of the resistant element 24 is changed as the acceleration sensor 5' receives an acceleration due to vibration of the seat spring 17, the voltage at both ends of the resistant element 24 changes, and this voltage change is amplified by the amplifier 8 of the signal processing means 6, filtered by the filter 7 to a required frequency component, and smoothed by the smoothing means 9 and issued to the judging means 10, so that the presence or absence of the human body on the seat 19 is judged by the judging means 10.

Herein, the acceleration sensor 5' is designed to amplify the vibration by the beam 22, and in order to detect a feeble vibration, a groove 29 is provided in part of the beam 22 so that the beam 22 is more likely to vibrate, but the strength of the beam 22 is lowered in such constitution, it is required to build the case 27 in a rigid structure to protect the beam 22 from the impact applied from outside when seated. Accordingly, if installed near the surface cloth 15, it is felt by the human body when sitting and the comfort of sitting is impaired, and in the conventional constitution, therefore, it could not be installed near the surface cloth 15, but in the embodiment, by fixing on the seat spring 17 at a specified distance r remote from the surface cloth 15, the effect on the comfort of sitting is eliminated. In this case, by the specified distance r remote from the surface cloth 15, the vibration applied to the acceleration sensor 5' is smaller, but since the shape or material has almost no effect on comfort of sitting, the degree of freedom of design of the acceleration sensor 5' is greater, and the sensitivity can be enhanced by, for example, increasing the size of the resistant element 24, so that a sufficient sensitivity for detecting the human body is obtained without installing closely to the surface cloth 15. Further, in the embodiment, not only the groove 29 is formed in the beam 22, but also a poise 30 is suspended at the end of the beam 22, so that the sensitivity of the acceleration sensor 5' is further enhanced.

By this operation, the invention can detect the vibration of the human body by fixing the acceleration sensor 5' in part of the seat 19 remote from the sitting position more than the specified distance, and the degree of freedom of design of the acceleration sensor 5' is greater, and various measures for enhancing the sensitivity may be considered for the acceleration sensor 5', so that the human body detection means capable of detecting the human body securely without practical effect on the comfort of sitting can be presented.

In the invention, by this operation, the acceleration sensor 5' is fixed on the seat spring 17 provided beneath the seat pad 16, but since the seat spring 17 is generally composed of metallic wires, the seat 19 is already composed so that it may not be felt by the human body seated on this seat spring 17, and as far as the acceleration sensor 5' has a similar hardness of the seat spring 17, it is not felt by the human body when fixed on the seat spring 17. Therefore, as far as it has an appropriate shape without protrusion, almost any acceleration sensor 5' can be disposed at this position without deteriorating the comfort of sitting, so that the degree of freedom of design is enhanced when disposing the acceleration sensor 5' on the seat.

As a further effect of the embodiment, the acceleration sensor 5' is protected by the seat pad 16. For example, if juice or water is spilled or lit cigarette is dropped on the surface of the seat 19, since the seat pad 16 is interposed against the sitting surface, water or heat of cigarette is hardly transmitted to the acceleration sensor 5', so that the risk of trouble or accident may be lowered.

In the embodiment, the acceleration sensor 5' is used as the vibration detection means 5, but aside from the acceleration sensor, piezoelectric elements and others may be used as far as the physical changes can be converted into an electric signal by vibration such as dislocation or distortion and sensitivity can be enhanced, and hence it is not an aim of the invention to limit the vibration detection means 5.

Figure 6:
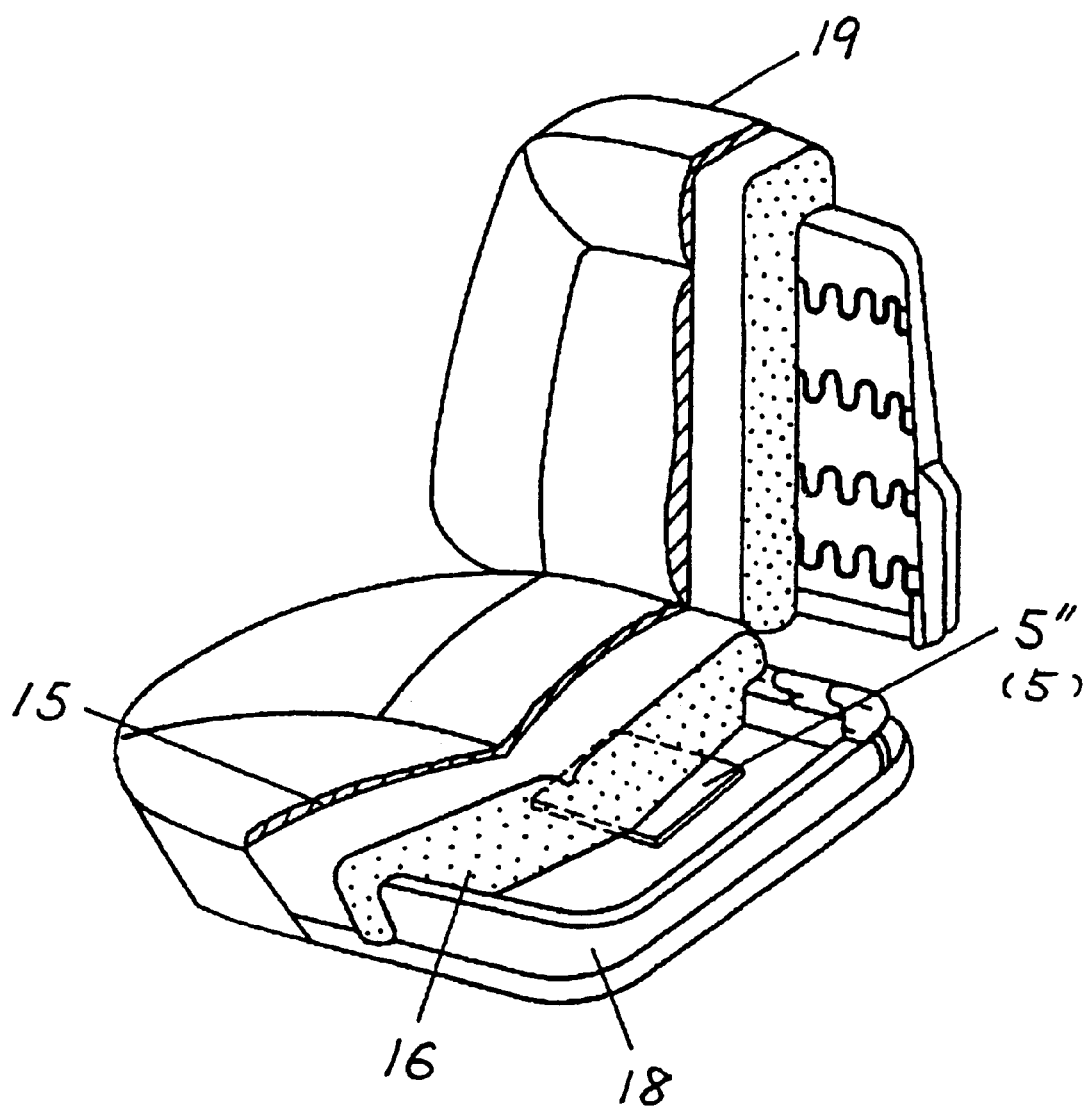
FIG. 6 is a perspective sectional view of a seat mounting a human body detector for seat in a second embodiment of the invention.
Figure 7:
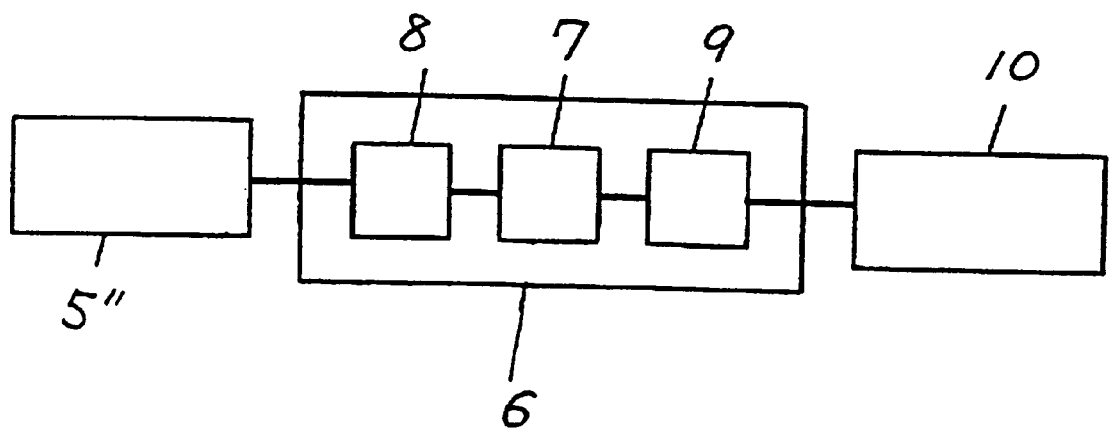
FIG. 7 is a block diagram of the same detector.

A second embodiment of the invention is described below together with the accompanying drawings. FIG. 6 is a perspective sectional view of a seat mounting a human body detector for seat in this embodiment, and FIG. 7 is a block diagram of the human body detector for seat of the embodiment. What this embodiment differs from the first embodiment is that the vibration detection means 5 is a flexible piezoelectric element 5", which is disposed between the seat pad 16 and seat frame 18 in contact with the seat pad 16. The piezoelectric element 5" is composed of a piezoelectric material, for example, polyvinylidene fluoride (PVDF), which is formed into a film, evaporated with metal electrode on both sides, polarized, protected with PET film on the surface, and formed into a band. In this case, depending on the directivity of polarization, generally, by polarizing in the thickness direction of the piezoelectric element 5", the piezoelectric element 5" generates a voltage output while the tension changes in the longitudinal direction of the band, and this constitution is employed in this embodiment.

An ordinary seat usually has a simple structure as shown in FIG. 6, in which a seat pad 16 is directly buried in a seat frame 18, and it is covered with a surface cloth 15. In the case of the seat 19 without seat spring 17 as shown in FIG. 3, in order to detect the vibration of the human body without deteriorating the comfort of sitting, the vibration detection means 5 is inserted in the seat pad 16, or is fixed and disposed on the surface of the seat pad 16, but the seat pad 16 generally becomes fragile in the course of time, and the rigid body held by the seat pad 16 cannot withstand the impact of seating after a certain period, and the seat pad 16 may be broken, and the vibration detection means 5 may be dislocated from the fixing position of the seat pad 16. To solve such problem, in this embodiment, the vibration detection means 5 is the flexible piezoelectric element 5", which is disposed between the seat pad 16 and seat frame 18 in contact with the seat pad 16.

The operation of such constitution is described below. When a human body is seated on the seat 19, its vibration is transmitted to vibrate the seat pad 16 through the surface cloth 15 of the seat 19, and this vibration causes to vibrate the piezoelectric element 5" disposed between the seat pad 16 and the seat frame 18 in contact with the seat pad 16, and it is deformed, and generates a voltage depending on the magnitude of the vibration. If the human body is at rest, the human body moves slightly by respiration or heart beat, and the vibration by such bodily motion also causes to generate a voltage depending on the magnitude of the vibration from the piezoelectric element 5" through the same route. Herein, since the piezoelectric element 5" is a flexible piezoelectric element, it can be disposed tightly to the undulated surface of the seat pad 16, and the vibration of the seat pad 16 generated in a slight gap between the seat pad 16 and seat frame 18 can be efficiently detected and converted into a voltage. Moreover, if the human body is seated on the seat 19 and the seat pad 16 is deformed by the pressure of the human body, since the piezoelectric element 5" is flexible, and follows up the deformation of the seat pad 16, and excessive stress is hardly applied to the seat pad 16, so that breakage of the seat pad 16 can be prevented. The generated voltage of the piezoelectric element 5" is amplified by the amplifier 8 of the signal processing means 6, filtered by the filter 7 to a required frequency component, and smoothed by the smoothing means 9 and issued to the judging means 10, so that the presence or absence of the human body on the seat 19 is judged by the judging means 10.

According to the operation of the invention, since the vibration detection means 5 is the flexible piezoelectric element 5", effects on comfort of sitting may be reduced even in the seat 19 without seat spring 17, and stress concentration in part of the seat pad 16 is avoided, and if the seat pad 16 becomes fragile in the time course, crack of piezoelectric element 5" may be decreased.

In the embodiment, as the vibration detection means 5, a film type piezoelectric element is used as the piezoelectric element 5", but a piezoelectric element of coaxial cable type processing PVDF into a tube may be also used as the vibration detection means 5. As far as flexible and capable of detecting vibration, it may not be limited to the piezoelectric element alone, but, for example, by using a strain gauge changing in the resistance when a strain is applied on the film, the human body detector for seat may be realized also in a similar constitution.

Figure 8:
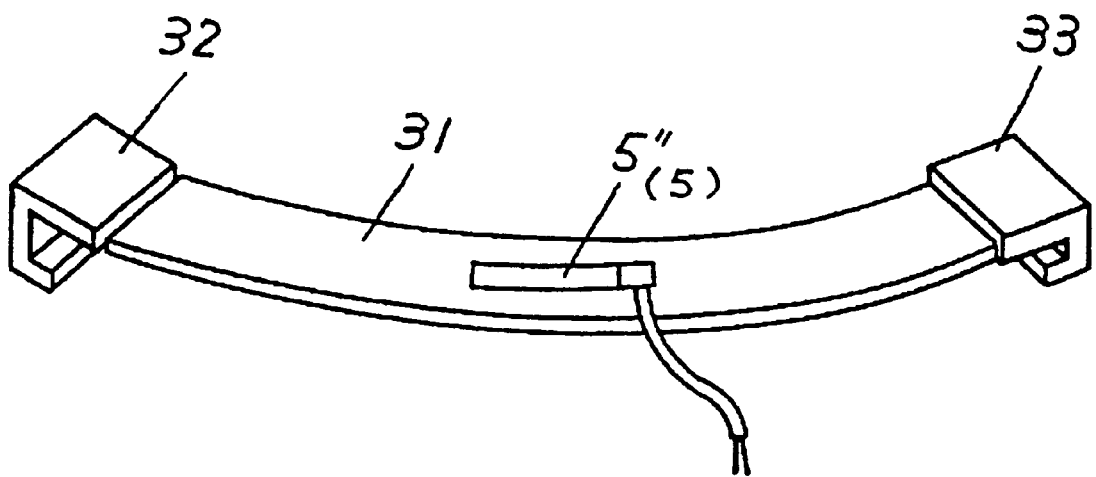
FIG. 8 is a perspective view of vibration detection means of a human body detector for seat in a third embodiment of the invention.
Figure 9:
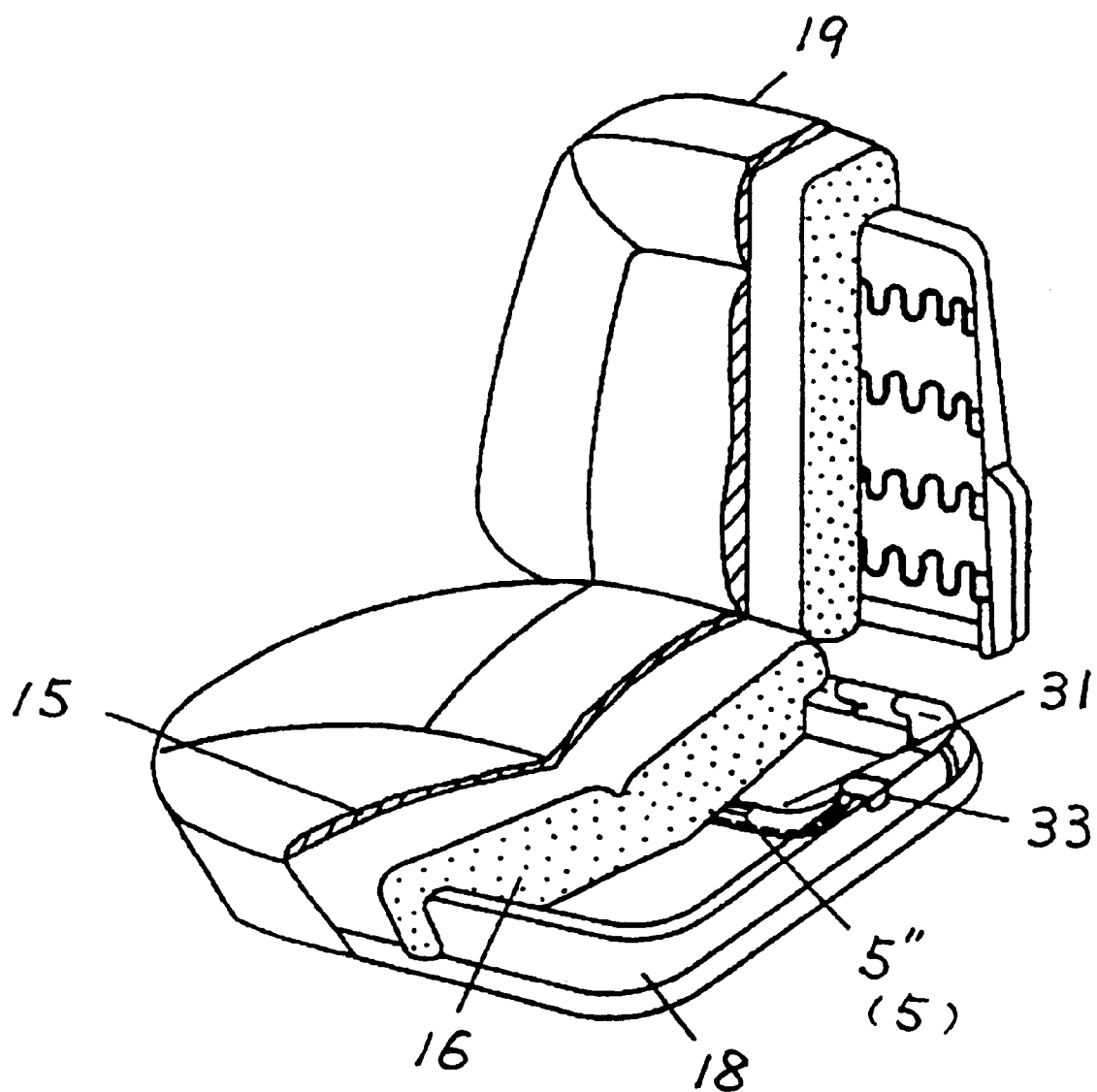
FIG. 9 is a sectional perspective view of a seat mounting the same detector.

A third embodiment of the invention is described below together with the accompanying drawings. FIG. 8 is a perspective view of vibration detection means of a human body detector for seat in this embodiment, and FIG. 9 is a perspective sectional view of the seat using this detector. What this embodiment differs from the second embodiment is that the vibration detection means 5 is disposed in a band element 31 placed beneath the seat pad 16 of the seat 19, and that this band element 31 has its ends 32, 33 fixed in part of the seat frame 18 so that a tension may be applied depending on the load received from the seat pad 16. The other constitution is same as in the second embodiment, and detailed description is omitted. In this embodiment, the band element 31 is composed of a PET film high in the strength and small in elongation.

Herein, the vibration detection means 5 is composed of the same piezoelectric element 5" as in the second embodiment, but it may be also replaced by small acceleration sensor, strain gauge, or others capable of converting physical changes by vibration such as displacement or distortion into an electric signal, and it is not an aim of the invention to limit the vibration detection means 5. In this embodiment, flexibility is not particularly required in the vibration detection means 5 itself.

As the band element 31, a PET film is used, but stainless steel plate, flexible carbon fiber, or other flexible materials capable of satisfying the required strength may be used.

The operation of this constitution is described. When a human body is seated on the seat 19, its vibration is transmitted to vibrate the seat pad 16 through the surface cloth 15 of the seat 19, and this vibration causes to vibrate the band element 31. At this time, since the band element 31 is fixed in part of the seat frame 18 so that a tension depending on the load received from the seat pad 16 may be applied, and therefore the vibration of the seat pad 16 is securely transmitted to the band element 31, and to the piezoelectric element 5", the vibrations of the seat pad 16 and band element 31 both contacting therewith are transmitted efficiently. When the piezoelectric element 5" vibrates and is deformed, a voltage depending on the magnitude of the vibration is generated. If the human body is at rest, the human body moves slightly by respiration or heart beat, and the vibration by such bodily motion also causes to generate a voltage depending on the magnitude of the vibration from the piezoelectric element 5" through the same route. The generated voltage of the piezoelectric element 5" is amplified by the amplifier 8 of the signal processing means 6, filtered by the filter 7 to a required frequency component, and smoothed by the smoothing means 9 and issued to the judging means 10, so that the presence or absence of the human body on the seat 19 is judged by the judging means 10.

According to the operation of the embodiment, since the band element 31 is fixed in part of the seat frame 18 so that a tension may be applied as receiving the load from the seat pad 16, the vibration of the seat pad 16 is securely transmitted to the band element 31, and to the piezoelectric element 5", the vibrations of the seat pad 16 and band element 31 both contacting therewith are transmitted efficiently, so that the sensitivity is enhanced.

Moreover, since the vibration detection means 5 is disposed in the band element 31, the vibration detection means 5 does not always require flexibility, and the degree of freedom is larger when selecting the vibration detection means 5.

In this embodiment, the band element 31 is fixed to the seat frame 18, but the fixing method includes tightening by screws by disposing fixing pieces at both ends of the band element 31, welding, and others, but not limited to such fixing with enough strength, a slightly free coupling method may be possible, such as a method of forming a key hole in the end of the band element 31 and inserting a hook into the hole in the seat frame 18, and any constitution may be formed as far as the tension is applied when the band element 31 receives the load from the seat pad 16.

Figure 10:
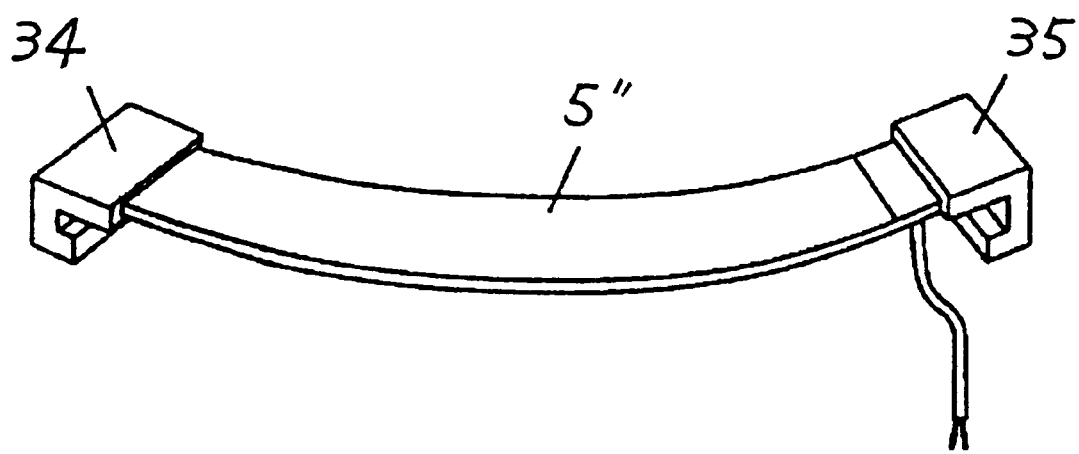
FIG. 10 is a perspective view of vibration detection means of a human body detector for seat in a fourth embodiment of the invention.
Figure 11:
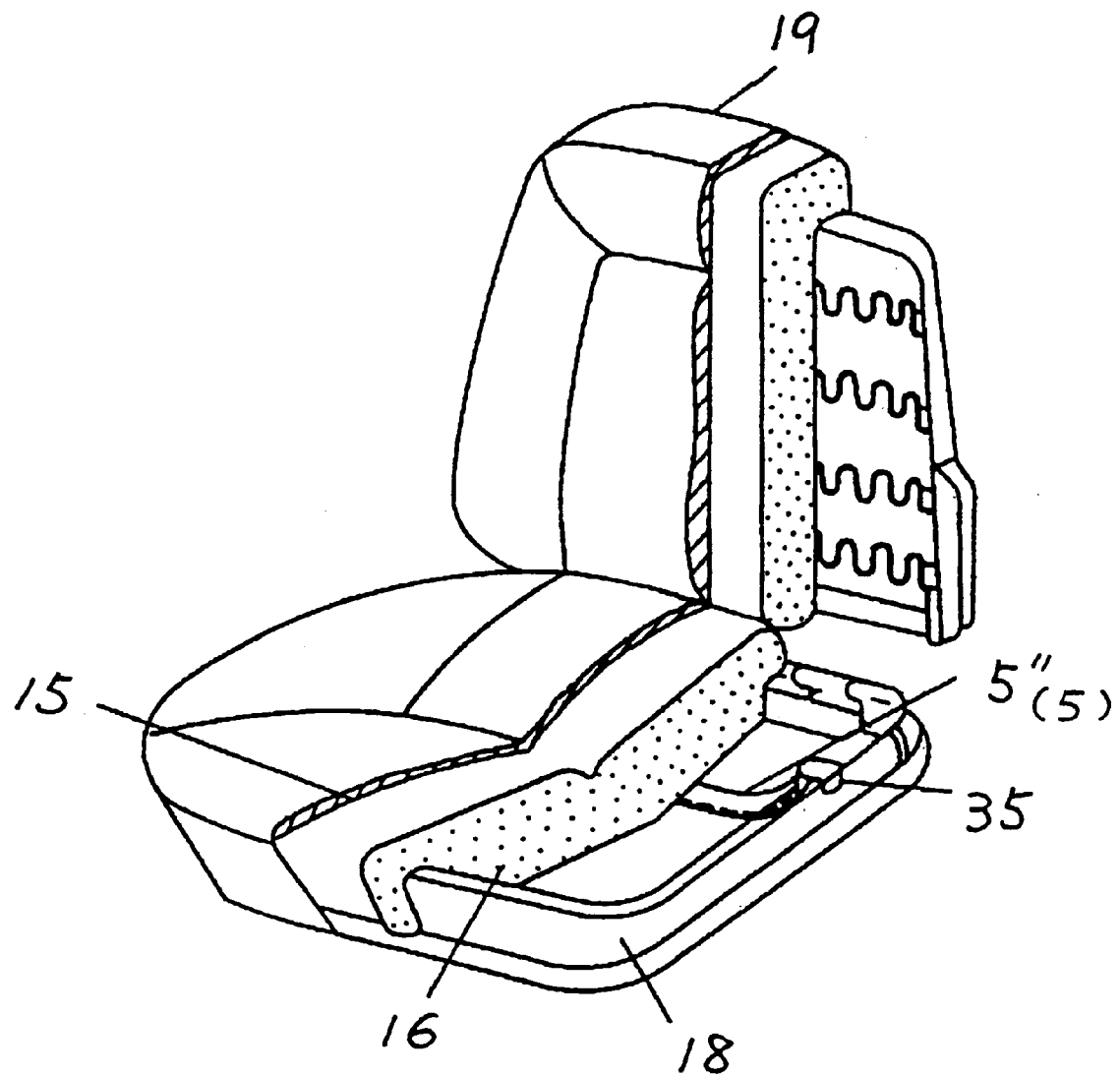
FIG. 11 is a sectional perspective view of a seat mounting the same detector.

A fourth embodiment of the invention is described below together with the accompanying drawings. FIG. 10 is a perspective view of vibration detection means of a human body detector for seat in this embodiment, and FIG. 11 is a perspective sectional view of the seat mounting this detector. What this embodiment differs from the third embodiment is that the vibration detection means 5 includes tension applying units 34, 35 for applying a tension to the piezoelectric element 5" by fixing the flexible piezoelectric element 5" and the seat frame 18. The tension applying units 34, 35 also serve as the fixing parts with the seat frame 18, and when the seat 19 is assembled, it is designed to apply a specific tension to the piezoelectric element 5" by the load from the seat pad 16 and fixing to the seat frame 18. The other constitution is same as in the second embodiment, and detailed description is omitted.

In this constitution, the piezoelectric element 5" has its both ends fixed to the seat frame 18 through the tension applying units 34, 35, and it is installed so that a constant tension may be applied when held between the seat pad 16 and seat frame 18, and this piezoelectric element 5", same as in the second embodiment, is designed to generate a voltage output corresponding to the tension change in the longitudinal direction, and it is intended to utilize this intrinsic performance effectively. Besides, since this piezoelectric element 5" is held by the seat pad 16 and seat frame 18, deformation by vibration is suppressed by the seat pad 16 or friction between the seat pad 16 and seat frame 18, and by applying a tension, deformation by vibration of the piezoelectric element 5" is more smoothly transmitted to the entire piezoelectric element 5", and the electric charge generated by the vibration, if the vibration is small, is increased, so that the sensitivity to the vibration of the piezoelectric element 5" may be enhanced. The generated voltage of the piezoelectric element 5" is amplified by the amplifier 8 of the signal processing means 6, filtered by the filter 7 to a required frequency component, and smoothed by the smoothing means 9 and issued to the judging means 10, so that the presence or absence of the human body on the seat 19 is judged by the judging means 10.

According to the operation of the embodiment, since a tension is applied to the flexible piezoelectric element 5" by the tension applying units 34, 35, the intrinsic piezoelectric performance of the piezoelectric element 5" may be utilized, and if the vibration is suppressed by the friction between the seat pad 16 and seat frame 18, the electric charge generated by the vibration may be increased, and it is effective to enhance the sensitivity to the vibration of the piezoelectric element 5".

In case the seat pad 16 is cracked, since the piezoelectric element 5" is fixed to the seat frame 18 by the tension applying units 34, 35, it is fixed at the specified position without deviating, so that the vibration of the human body can be detected continuously.

Moreover, since the seat frame 18 is formed of a metal plate, it is composed so that the seat frame 18 may not be felt by the seated human body, and therefore if a tension is applied to the piezoelectric element 5", if disposed between the seat pad 16 and seat frame 18, the piezoelectric element 5" is hardly felt by the human body.

In this embodiment, the tension applying units 34, 35 are fixed to the edge of the seat frame 18, but the tension applying units 34, 35 may be also fixed, for example, on the undulated surface of the seat frame 18, or to the seat spring 17 in the case of the seat comprising the seat spring 17. The fixing method includes tightening of the tension applying units 34, 35 and the edge of the seat frame 18 by screws, and welding, or a slightly free coupling method, such as a method of forming key holes in the ends of the tension applying units 34, 35 and inserting hooks into the holes in the seat frame 18, and any method of installation is possible as far as specific tension is applied when held between the seat pad 16 and seat frame 18, and it is not an aim of the invention to limit the method of installation of the vibration detection means 5.

Figure 12:
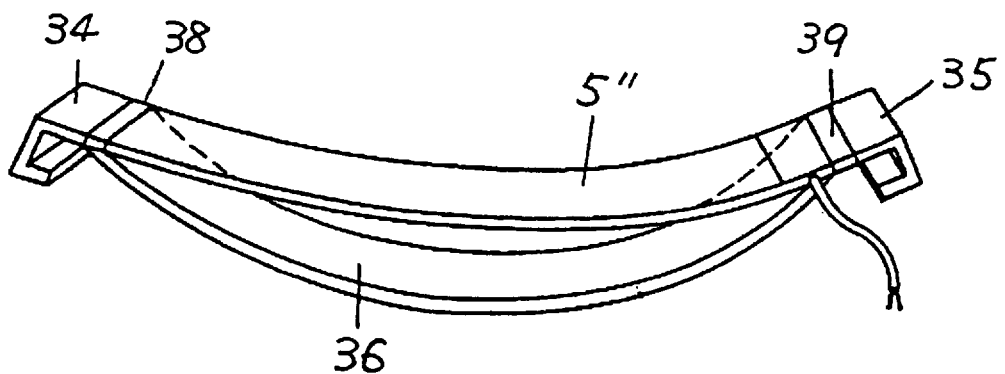
FIG. 12 is a perspective view of vibration detection means of a human body detector for seat in a fifth embodiment of the invention.

A fifth embodiment of the invention is described below together with the accompanying drawings. What this embodiment differs from the fourth embodiment is, as shown in FIG. 12, that the vibration detection means 5 includes a tension controller 36 for controlling the tension applied to the piezoelectric element 5" so that any tension exceeding a predetermined value may not be applied to the piezoelectric element 5". The other constitution is same as in the fourth embodiment, and detailed description is omitted. Herein, the tension controller 36 is formed of a material longer in dimension than the piezoelectric element 5" and smaller in extension than the piezoelectric element 5", for example, a stainless steel plate, and its ends 38, 39 are fixed to both ends of the piezoelectric element 5". The ends 38, 39 are formed integrally with the tension applying units 34, 35 serving also as the fixing parts to the seat frame 18. The tension controller 36 is not limited to stainless steel plate only, but may be formed of member of other material or shape as far as satisfying such dimension and extension requirements such as piano wire or resin film of small extension.

In this constitution, the piezoelectric element 5" has its both ends fixed to the seat frame 18 through the tension applying units 34, 35, and it is installed so that a constant tension may be applied when held between the seat pad 16 and seat frame 18, and this piezoelectric element 5", same as in the second embodiment, is designed to generate a voltage output corresponding to the tension change in the longitudinal direction, and it is intended to utilize this intrinsic performance effectively. Besides, since this piezoelectric element 5" is held by the seat pad 16 and seat frame 18, deformation by vibration is suppressed by the seat pad 16 or friction against the seat frame 18, and by applying a tension, deformation by vibration of the piezoelectric element 5" is more smoothly transmitted to the entire piezoelectric element 5", and the electric charge generated by the vibration, if the vibration is small, is increased, so that the sensitivity to the vibration of the piezoelectric element 5" may be enhanced. The generated voltage of the piezoelectric element 5" is amplified by the amplifier 8 of the signal processing means 6, filtered by the filter 7 to a required frequency component, and smoothed by the smoothing means 9 and issued to the judging means 10, so that the presence or absence of the human body on the seat 19 is judged by the judging means 10. An excessive tension may be applied to the piezoelectric element 5" due to impact when sitting on the seat, and concerning such excessive tension, the tension applied to the piezoelectric element 5" is limited so that any tension exceeding a predetermine value may not be applied to the piezoelectric element 5" by the tension controller 36.

In this constitution, if an excessive tension is applied to the piezoelectric element 5", since the stainless steel plate used in the tension controller 36 is a member longer in dimension than the piezoelectric element 5" and smaller in extension than the piezoelectric element 5", if the piezoelectric element 5" is elongated by application of tension, it is not elongated more than the length of the tension controller 36, so that the piezoelectric element 5" may not be broken. The length of the stainless steel plate used in the tension controller 36 may be, supposing the length of the piezoelectric element 5" to be L, set in a range of L and more and the sum of L and ΔL or less, by investigating the elongation ΔL at the yield point of the piezoelectric element 5" by, for example, tensile test.

In the fourth embodiment, by applying a tension to the piezoelectric element 5", the sensitivity is enhanced, but due to seating impact, for example, an excessive tension over the yield point may be applied to the piezoelectric element 5", thereby lowering the sensitivity or breaking down the piezoelectric element 5". By the operation mentioned above, however, according to the embodiment, since the tension applied to the piezoelectric element 5" is controlled by the tension controller 36 so that any tension exceeding a predetermined value may not be applied to the piezoelectric element 5", the piezoelectric element 5" is free from such lowering of sensitivity or breakdown, and the durability of strength is enhanced.

By the same operation, the tension controller 36 is formed of a member longer in the dimension than the piezoelectric element 5" and smaller in extension than the piezoelectric element 5", so that the tension applied to the piezoelectric element 5" can be controlled by a simple and inexpensive constitution.

Figure 13:
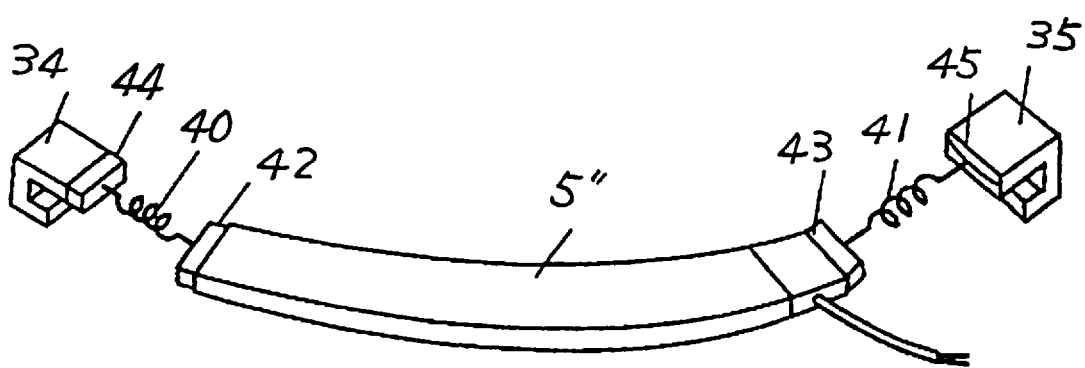
FIG. 13 is a perspective view of vibration detection means of a human body detector for seat in a sixth embodiment of the invention.

According to the fifth embodiment, the tension controller 36 is formed of a member longer in the dimension than the piezoelectric element 5" and smaller in extension than the piezoelectric element 5", and its ends are fixed to both ends of the piezoelectric element 5", and as a sixth embodiment of the invention, as shown in FIG. 13, the tension controller 36 may be formed of an elastic member for coupling the piezoelectric element 5" and seat frame 18, for example, coil springs 40, 41. In FIG. 13, ends 42, 43 of the coil spring 40, 41 are fixed to both ends of the piezoelectric element 5", while other ends 44, 45 are fixed to the tension applying units 34, 35 serving also as fixing means to the seat frame. The spring constant of the coil springs 40, 41 can be determined by experiment, and, for example, the spring constant easily extended by the tension below the yield point strength of the piezoelectric element 5" may be selected.

Further, in the third embodiment, the length L1 of the stainless steel plate used in the tension controller 36 may be set in a range of L or more and the sum of L and ΔL or less, but if the value of ΔL is small depending on the member used in the piezoelectric element 5", a higher dimensional precision may be needed when forming L1. However, by using such coil springs 40, 41, if an excessive tension is applied, the coil springs 40, 41 are elongated, and the tension applied to the piezoelectric element 5" is decreased. In this case, therefore, high dimensional precision is not required when forming the coil springs 40, 41. Therefore, it is effective to control the tension applied to the piezoelectric element 5" in a further simple and inexpensive structure than in the fifth embodiment.

Incidentally, the elastic member used in the tension controller 36 is not limited to the coil spring only, and other members satisfying the elastic conditions such as leaf spring and rubber member may be used.

In this embodiment, the tension controller is provided at both ends of the piezoelectric element 5", but may be provided at one end only.

The second, third, fourth, fifth and sixth embodiments relate to the seat without seat spring 17, but may also employ the vibration detection means 5 having the tension applying units 34, 35 or tension controller 36 in the seat having the seat spring 17 as stated in the first embodiment. The vibration detection means 5 is disposed in the lateral direction of the seat frame 18, but it may be also disposed in the longitudinal direction of the seat frame 18, or a plurality may be disposed, or it may be disposed at the back rest side.

In the foregoing second, fourth, fifth and sixth embodiments, the vibration detection means 5 is composed of flexible piezoelectric element 5", but it may be also replaced by a strain gauge using an flexible resistant element, or a flexible structure by enveloping a nonflexible ceramic piezoelectric element integrally with an flexible resin film. That is, any material capable of amplifying and issuing an electric signal by application of tension may be used, and it is not an aim of the invention to limit the vibration detection means 5.

Figure 14:
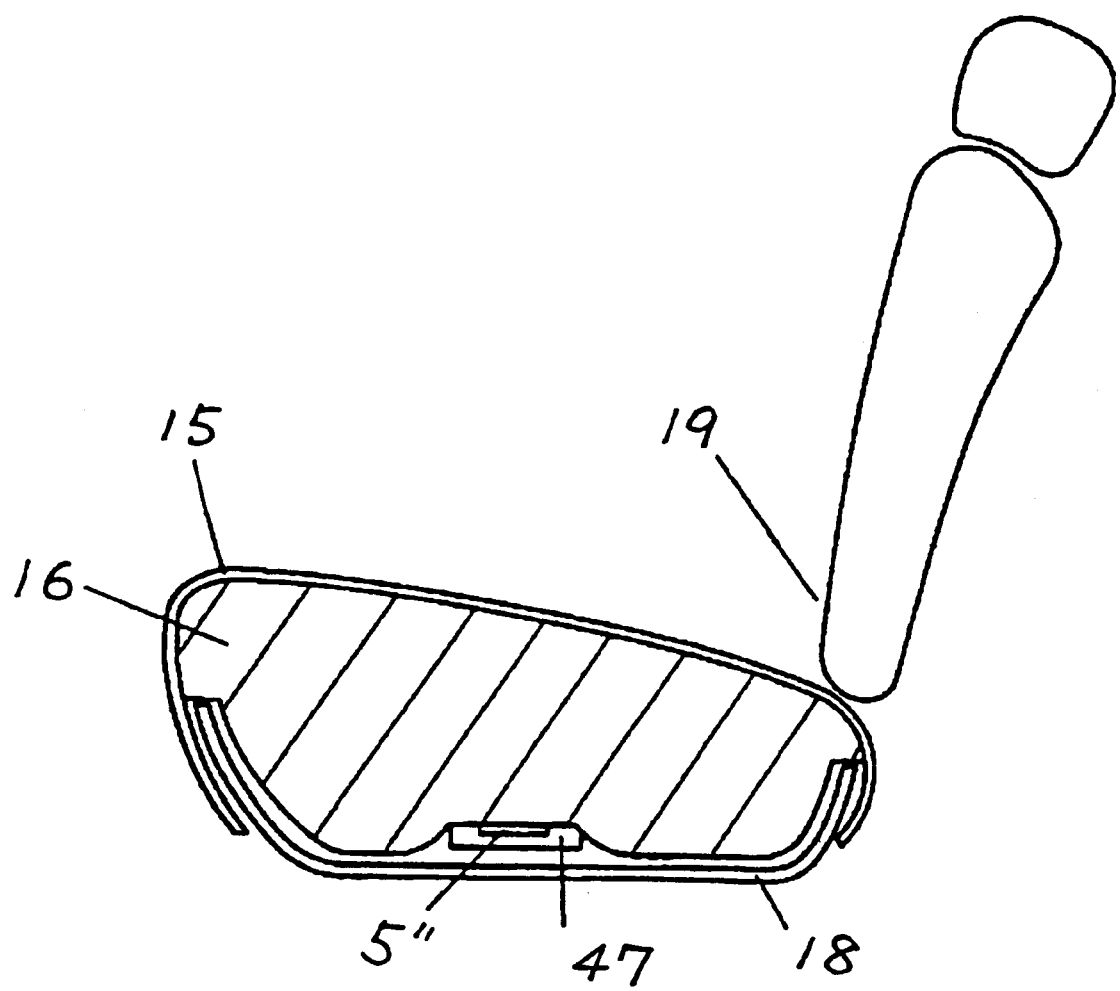
FIG. 14 is a sectional view of a seat mounting a human body detector for seat in a seventh embodiment of the invention.
Figure 15:
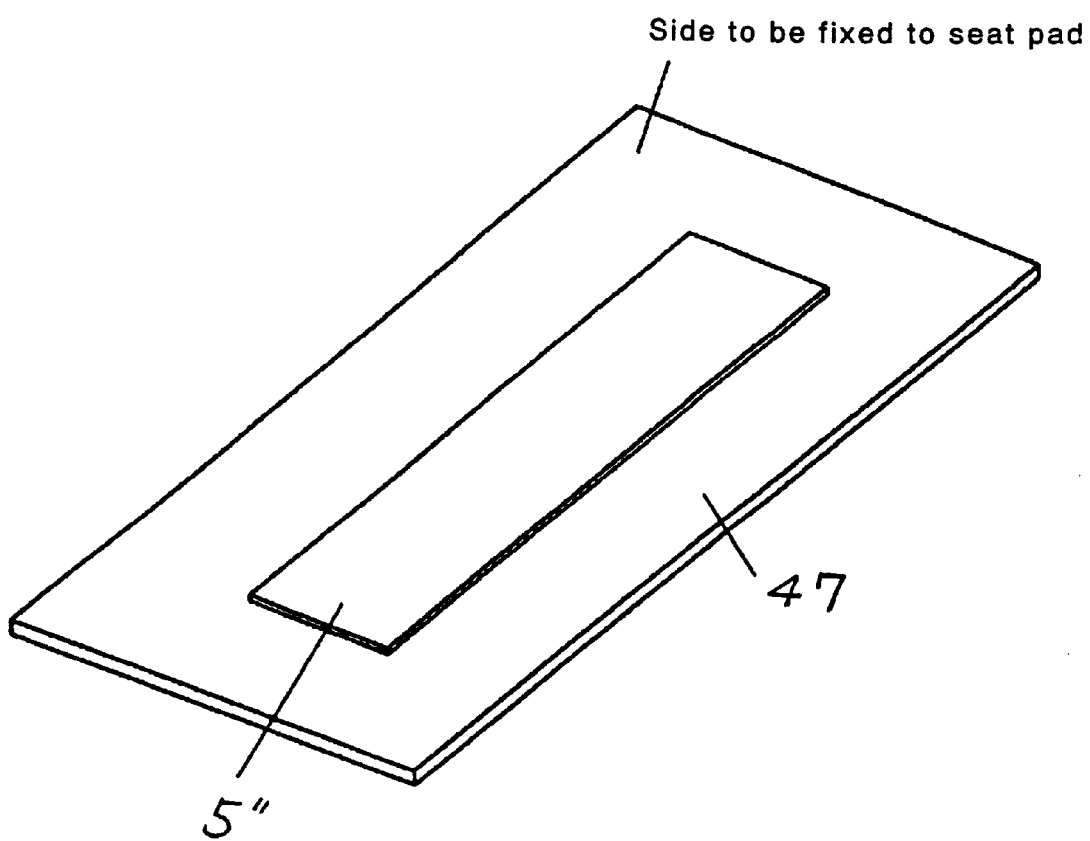
FIG. 15 is a perspective view of vibration detection means of the same detector.
Figure 16:
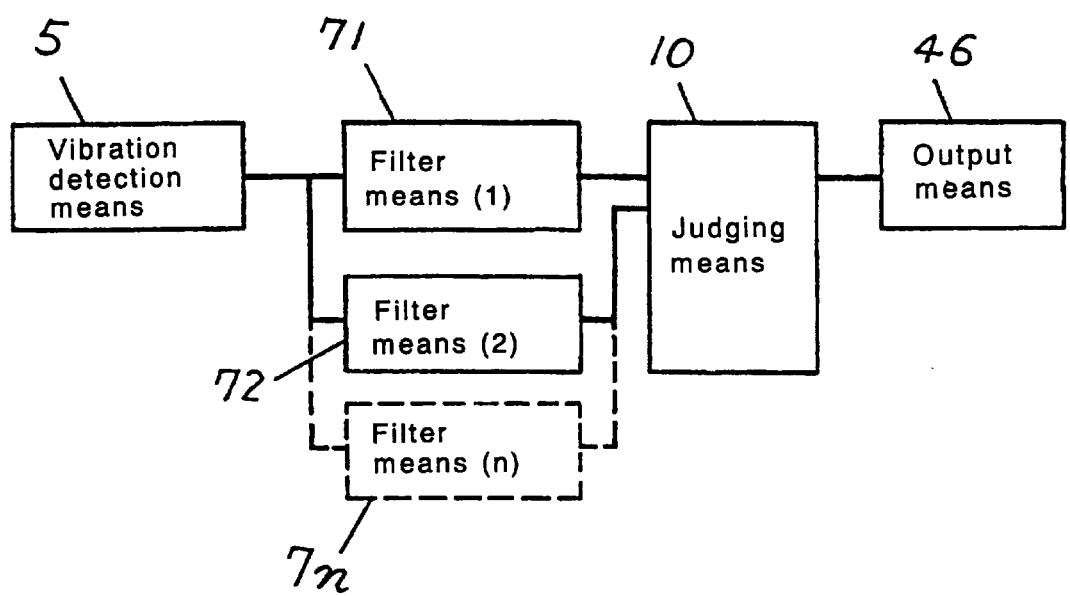
FIG. 16 is a block diagram of the detector, FIG. 17 (a) is a sectional view of a seat mounting a human body detector for seat in an eighth embodiment of the invention, FIG. 17 (b) is a perspective view of a part of the seat mounting the detector.

A seventh embodiment of the invention is described below together with the accompanying drawings. FIG. 15 is a perspective view of vibration detection means 5 of the human body detector for seat of the embodiment, and the vibration detection means 5 is composed of a flexible piezoelectric element 5" and a buffer 47, and the piezoelectric element 5" is flexible, and fixed on the surface of the buffer 47. FIG. 14 is a sectional view of a seat 19 mounting the human body detector for seat of this embodiment, in which the piezoelectric element 5" as the vibration detection means is fixed in the bottom of the seat pad 16 of the sitting surface of the seat 19 in tight contact together with the buffer 47. FIG. 16 is a block diagram of the human body detector for seat of the embodiment, in which the human body detector for seat of the embodiment is mounted on the seat of an automobile.

In this constitution, the vibration detection means 5 is composed of the piezoelectric element 5" and the buffer 47, and the piezoelectric element 5" is held between the buffer 47 and the seat pad 16, and is fixed to the seat pad 16, and therefore it efficiently receives the vibration of the human body from the sitting surface, while unnecessary vibrations from the seat frame 18 side are hardly transmitted to the piezoelectric element 5" because the piezoelectric element 5" is covered with the buffer 47, and if the piezoelectric element 5" is held and pressed between the seat pad 16 and the seat frame 18 for supporting the seat pad 16 when sitting on the seat, vibrations transmitted from other than the sitting surface from the seat frame 18 are absorbed by the buffer 47, and therefore the piezoelectric element 5" selectively receives the vibration from the sitting surface necessary for detecting the human body on the seat 19.

To receive the vibration of the sitting surface efficiently, the piezoelectric element 5" is desired to be fitted tightly to the bottom of the seat pad 16, and the material for the buffer 47 is preferred to be, for example, flexible urethane capable of changing in shape to contact tightly with the bottom of the seat pad having the sitting surface in a complicated and undulated surface shape easily and entirely, needle punched felt of waste cotton low in cost although not sufficient in contact tightness, or soft material capable of absorbing vibration and flexibly coping with complicated shape. In any material, however, since the hardness is important for preventing transmission of vibration, it is preferred to use a proper material adjusted to a proper hardness depending on the mounting method on the piezoelectric element 5" and the condition of use in the composition of the buffer 47.

For fixing the buffer 47 and seat pad 16, it is effective to use a very thin both-adhesive tape not attenuating the vibration from the sitting surface of the seat 19 transmitted from the seat pad 16, or an adhesive not curing after adhesion.

To assemble the vibration detection means of the embodiment into the seat pad 16, the piezoelectric element 5" may be first adhered to the bottom of the seat pad 16, and then the buffer 47 may be sequentially glued thereon, or by preliminarily fixing the piezoelectric element 5" on the surface of the buffer 47, this integrated vibration detection means 5 may be adhered to the bottom of the seat pad 16 as a unit, and in this process, when assembling the seat main body, it is not necessary to control relatively small components such as piezoelectric element 5" and buffer 47 separately, and the degree of freedom is increased in the place of assembling and time of assembling, so that the process may be rationalized.

In this embodiment, the human body detector for seat is installed in the seat of an automobile, and in this case, as shown in the block diagram in FIG. 16, it comprises vibration detection means 5, plural filter means 71, 72, . . . , 7n for taking out signals of different frequencies from the outputs of the vibration detection means 5 as signal processing means 6, judging means 10 for judging the presence or absence of human body on the seat 19 on the basis of the outputs from these filter means 71, 72, . . . , 7n, and output means 46 for issuing a signal to a device connected outside (not shown) for operating according to the judgement of the human body detector for seat of the invention on the basis of the judgement of the judging means 10, in which the filter means (1) 71 to filter means (n) 7n take out human natural vibration frequency components and vibration frequency components excited by running of the vehicle, from the signals corresponding to the vibrations detected by the vibration detection means 5 and issued to the judging means 10.

To judge the human body in the judging means 10 of the human body detector for seat of the embodiment, in the vibrating environments of automobile or the like, the human body on the seat 19 vibrates at the human natural vibration frequency, and the generation of such human natural vibration components is detected aside from other vibration components of the automobile, and when a person is seated on the seat 19, the output of the filter means (1) 71 for taking out the human natural vibration frequency component f1 is similar to or larger than the output of the filter means (2) 72 for taking out the automobile vibration frequency component f2, and, to the contrary, when luggage or other object than human body is present on the seat 19, the output of the filter means (1) 71 for taking out the human natural vibration frequency component f1 is smaller, but the output of the filter means (2) 72 for taking out the automobile vibration frequency component f2 is unchanged, and therefore by comparing the difference in size of the two outputs, it is judged whether the human body or other object is present on the seat 19. Meanwhile, the human vibration frequency component is usually in a range of 3 Hz to 10 Hz, while the automobile vibration frequency is often before and after the range, and hence as the filter means 7 for distinguishing the two, a band pass filter capable of setting the bandwidth is effective.

Figure 17A:
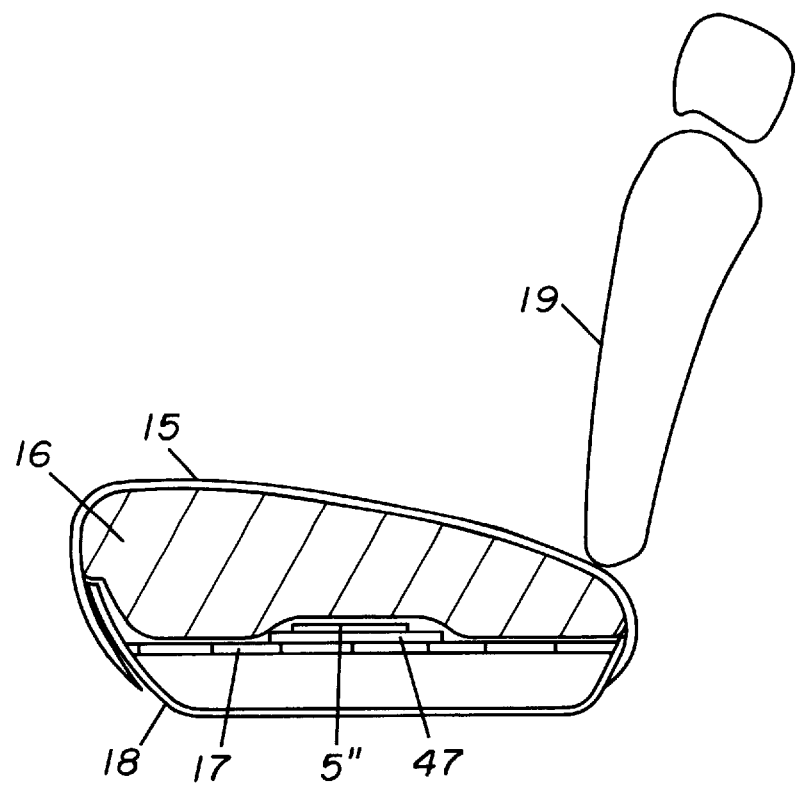
Figure 17B:
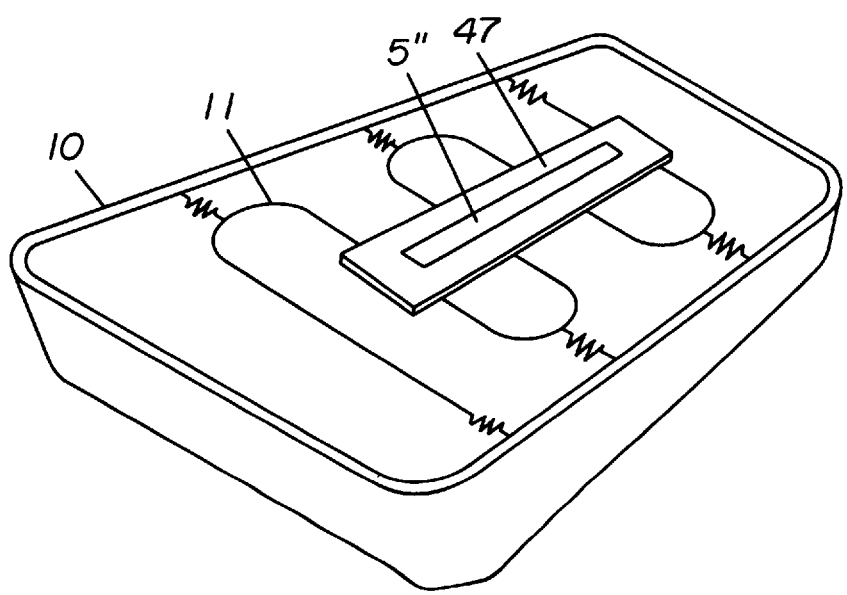

An eighth embodiment is described below together with the accompanying drawings. In FIG. 17, (a) is a sectional view of the seat mounting the vibration detection means of the invention, and (b) is a perspective view of the fitting portion of the vibration detection means of the seat. In the seat 19 used in this embodiment, a seat pad 16 is held between a seat frame 18 and a seat spring 17 coupled to the seat frame 18.

As shown in FIG. 17, in this embodiment, same as in the seventh embodiment, the vibration detection means 5 is composed of a flexible piezoelectric element 5" and a buffer 47, with the piezoelectric element 5" fixed to the buffer 47, and the buffer 47 is fixed to a seat spring 11 coupled to a seat frame 10 for holding the seat pad 16, with its side for fixing the piezoelectric element 5" of the buffer 47 disposed in contact with the bottom of the seat pad 16 together with the piezoelectric element 5".

In this constitution, the piezoelectric element 5" of the vibration detection means 5 contacts with the seat pad 16, but when a person is seated, due to pressure of the human body, the seat pad 16 and the piezoelectric element 5" contact with each other tightly, and the vibration from the sitting surface of the seat 19 is more smoothly received, while the vibration from other than the sitting surface of the seat 19 transmitted from the seat spring 17 is absorbed by the buffer 47, and is hardly transmitted to the piezoelectric element 5". On the other hand, when nothing or something very light is put on the seat 19, although the seat pad 16 and piezoelectric element 5" contact, since the pressure is weak, almost no vibration is transmitted from the sitting surface of the seat 19, and the vibration transmitted to the piezoelectric element 5" is mostly the component of the automobile vibration transmitted from the seat spring 17. Therefore, in the presence of human body, the human vibration is transmitted more strongly, and in the absence of human body, the automobile vibration is transmitted more strongly, so that the difference in the signal obtained by presence or absence of human body is greater, so that the human body detector for seat of high sensitivity is realized.

For mounting the vibration detection means 5 on the seat spring 17, the contact tightness to the seat spring 17 is not required, and the seat spring 17 is usually formed of wire and does not have a wide plane, and therefore, instead of fixing by adhesive or both-adhesive tape, it is preferred to fix several points of the buffer 47 by winding on the seat spring 17 by using C-ring or the like, so that secure fixing is assured.

In this embodiment, the vibration detection means 5 is fixed to the seat spring 17, but similar effects are obtained in a constitution of fixing on the seat frame 18 for holding the seat spring 17. Therefore, the human body detector for seat of the embodiment may be applied also in the seat having the seat spring 17 used in part of the seat or in the seat completely free of seat spring 17, and similar effects are expected.

Figure 18:
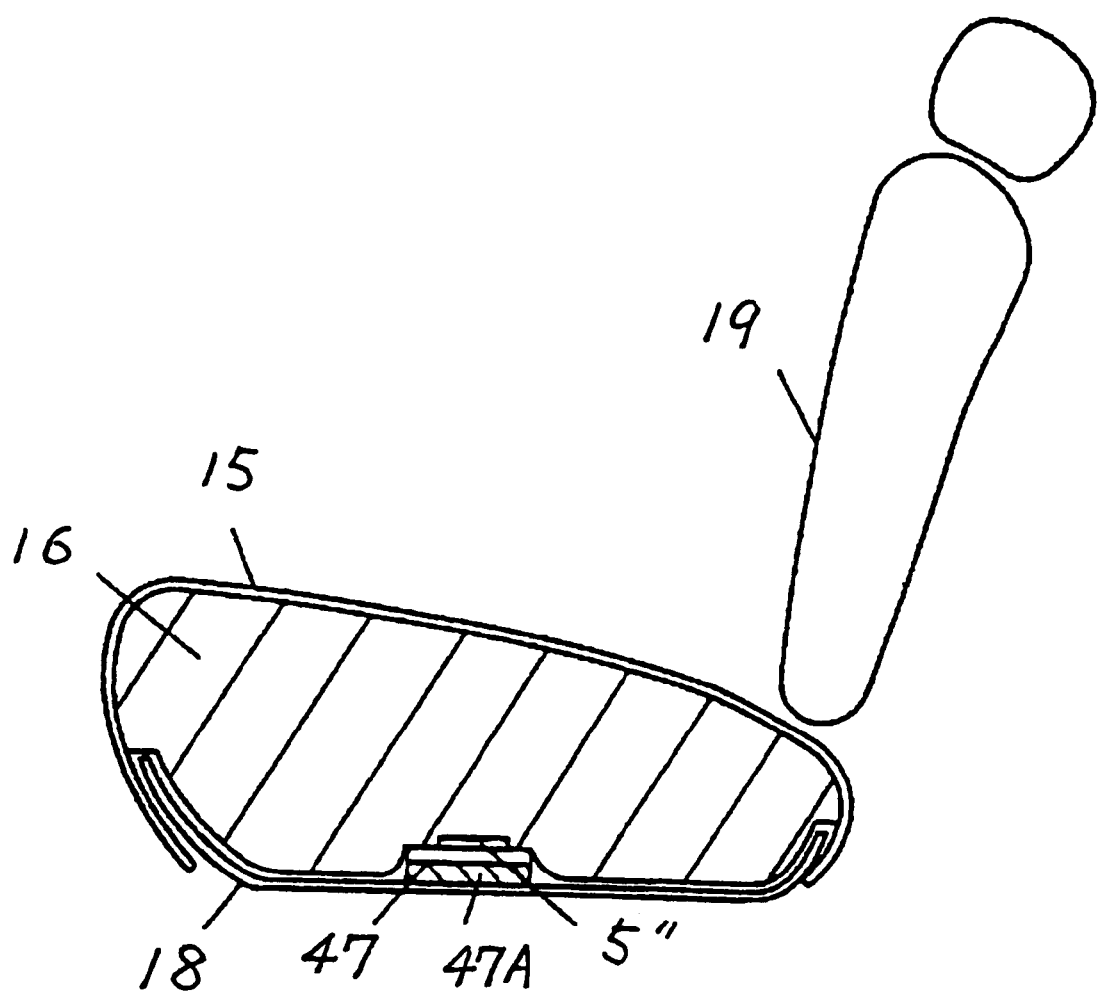
FIG. 18 is a sectional view of a seat mounting a human body detector for seat in a ninth embodiment of the invention, FIG. 19 (a) is a perspective view of the side for fixing a vibration detector of a buffer of vibration detection means of the detector, FIG. 19 (b) is a perspective view of the side not fixing the vibration detector of the buffer of the vibration detection means of the detector, FIG. 19 (c) is a sectional view of A—A of the vibration detection means of the detector.

A ninth embodiment is described below together with the accompanying drawings. FIG. 18 is a sectional view of a seat mounting a human body detector for seat of this embodiment, FIG. 19 shows perspective view and sectional view of the vibration detection means of the detector.

Figure 19A:
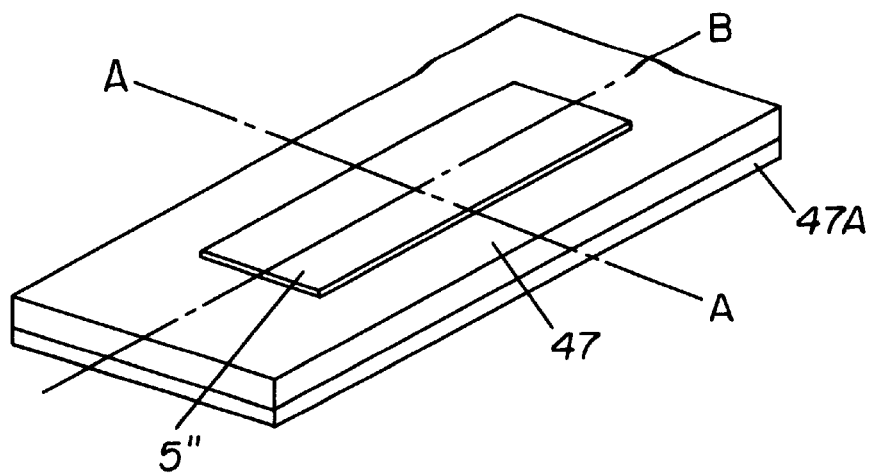
Figure 19B:
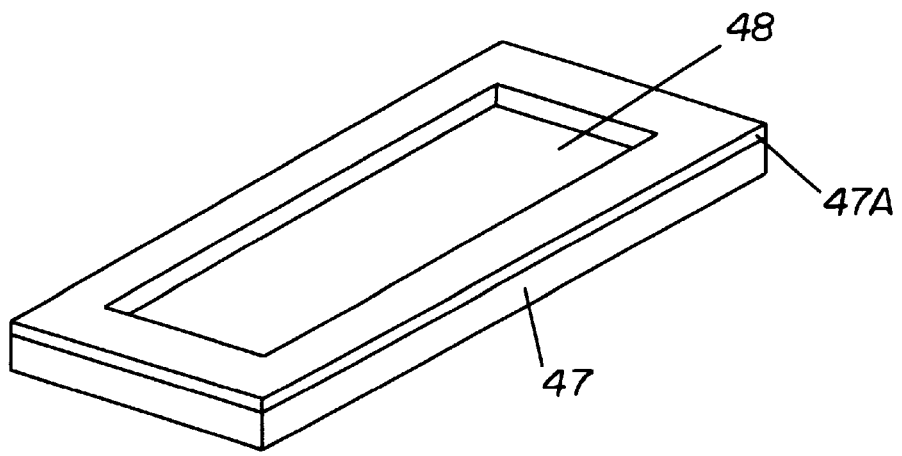
Figure 19C:
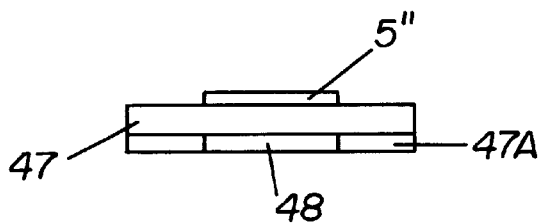

As shown in FIG. 18 and FIG. 19, in this embodiment, there is a recess 48 in the surface of a buffer 47, and a flexible piezoelectric element 5" as vibration detector is fixed at a position facing the recess 48 at the opposite side of the side of the recess 48 of the buffer 47, and the buffer 47 has its side for fixing the piezoelectric element 5" of the buffer 47 adhered to the bottom of the seat pad 16 together with the piezoelectric element 5".

In this constitution, since the piezoelectric element 5" of the vibration detection means 5 is fixed to the bottom of the seat pad 16, it is more likely to receive vibration from the sitting surface. Same as in the seventh embodiment of the invention, moreover, since the piezoelectric element 5" is covered with the buffer 47, when a person is seated, if pressed against the seat pad 16 and the seat frame 18 for supporting the seat pad 16, the vibration from other than the sitting surface of the seat 19 transmitted from the seat frame 18 is absorbed by the buffer 47, and is hardly transmitted to the piezoelectric element 5", so that the piezoelectric element 5" selectively receives the vibration from the sitting surface necessary for detecting the human body on the seat 19. Further, according to the human body detector for seat of the embodiment, since the buffer 47 has the recess 48 at the back side of the fixed surface of the piezoelectric element 5", a gap is formed between the buffer 47 and seat frame 18. This gap is located at a position facing the piezoelectric element 5" fixed to the buffer 47, and therefore the piezoelectric element 5" vibrates by the vibration transmitted from the sitting surface without receiving impedance to the vibration action from the seat frame 18 and buffer 47, so that a lager signal depending on the vibration of the sitting surface can be issued from the piezoelectric element 5".

In the human body detector for seat of the embodiment, a peripheral area 47A of the recess at the recess 48 side of the buffer 47 in FIG. 19 is made of a material lower in hardness than other parts of the buffer 47, and the area of lower hardness absorbs the vibration, and vibration is not transmitted to the parts of higher hardness, and so that the vibration is absorbed more smoothly, and unnecessary vibration from other than the sitting surface of the seat 19 transmitted from the seat frame 18 for supporting the seat pad 16 is hardly transmitted to the piezoelectric element 5".

In this constitution, further, since the other parts than the peripheral area 47A of the recess at the recess 48 side in the buffer 47 are higher in hardness and hardly absorb vibration, the received vibration is more likely to be transmitted, and even at the position of the seat pad 16 not contacting directly with the piezoelectric element 5", if the buffer 47 is contacting, the vibration of the seat pad 16 is transmitted, and the buffer 47 vibrates, so that the vibration is transmitted to the piezoelectric element 5" fixed to the buffer 47.

The buffer 47 of the embodiment having such effects is composed of two members, and one is a flat sponge having a square through-hole opened in the center, which is the peripheral area 47A of the recess of the buffer 47, and other is a flat buffer higher in hardness than the peripheral area 47A of the recess, and by adhering the two members, the buffer having the recess 48 and lower in hardness in the peripheral area 47A of the recess than the hardness of the opposite side of the side having the recess 48 may be easily composed.

In this embodiment, the recess 48 is provided, but a through-hole penetrating through the buffer 47 may be formed, instead. In such a case, however, the portion for holding and fixing the vibration detection means 5 is required, and the shape is limited, but it can be processed only by drilling a hole in a flat material, and it is easier to form than composing the recess.

Incidentally, only one large recess 48 is provided in the embodiment, but a plurality of smaller recesses 48 may be formed. In this case, by disposing the piezoelectric element 5" immediately beneath between the recess 48 and recess 48, the thickness of the buffer 47 between the recesses 48 serves as the beam for supporting the piezoelectric element 5", and the adhesion of the piezoelectric element 5" to the seat pad 16 is enhanced, and the sensitivity to the vibration can be upgraded, and moreover peeling of the piezoelectric element 5" from the seat pad 16 is prevented, and therefore if used for a long period, the piezoelectric element 5" is not separated from the seat pad 16, and troubles can be decreased. In this case, too, the recesses 48 may be penetrating, or plural through-holes and recesses may be combined, and similar effects are obtained.

In the embodiment, the recess 48 is provided, and the peripheral area 47A of the recess is formed of a material low in hardness, but without forming the recess 48, only by using a material lower in hardness than the material for the fixed side of the piezoelectric element 5", in the entire surface of the opposite side of the fixed side of the piezoelectric element 5" of the buffer 47, unnecessary frequency component transmitted from the seat frame 18 can be attenuated, and it is effective so that the piezoelectric element 5" may receive selectively only the vibration from the sitting surface of the seat 19 used in judgement of presence of human body.

Also in the embodiment, the buffer is composed by adhering two sheets of materials differing in hardness, but similar effects are obtained by using a foamed material, and changing the foaming rate partly, so that the hardness may differ between the fixing side of the piezoelectric element 5" and the opposite side. Not limited to such foamed material, similar effects are obtained by any other single material capable of changing the ease of transmission of vibration partly. In the case of foamed material, a desired shape can be obtained by using a molding die, and the buffer 47 can be molded easily according to the complicated shape of the recess 48 or shape of the seat pad 16. Not limited to molding, moreover, using airtight multiple tiny air bags, they may be mutually linked to compose a buffer, or put into a larger frame or bag in a composition not separating from each other if not linked mutually, and thus the buffer may be formed in various shapes.

The buffer 47 is fixed, in this embodiment, to the seat spring 17 held by the seat frame 18, but it may be directly fixed to the seat frame 18, and similar effects are expected in the seat without seat spring 17.

In the foregoing seventh, eighth and ninth embodiments, the vibration detection means 5 is disposed in the lateral direction of the seat frame 18, but it may be also disposed in the longitudinal direction of the seat frame 18, a plurality may be disposed, or it may be disposed at the back rest side.

Also in the seventh, eighth and ninth embodiments, the vibration detection means is composed of a flexible piezoelectric element 5", but it may be also composed of strain gauge using a flexible resistant element, or a nonflexible ceramic piezoelectric element integrally enveloped with a flexible resin film to form a flexible composition. More specifically, if the problems of follow-up property to the shape of the seat 19, sensitivity, and comfort of sitting can be solved, a nonflexible material may be used, as far as the applied vibration can be converted into an electric signal, and it is not an aim of the invention to limit the vibration detection means 5.

In some of the foregoing embodiment, the automobile seat is represented as the seat for mounting the human body detector for seat of the invention, but this is only a representative example of the seat in a vibrating environment, and it may be applied to a seat used in any vibrating environment such as railway train and factory working seat, or in an ordinary environment, the vibration may be applied to the vibration detection means by, for example, a passerby, and the human body detector for seat not malfunctioning due to such vibration may be presented, and therefore the vibrating environment is not particularly limited. Anyway, the invention is not intended to limit the applications of the seat.

INDUSTRIAL APPLICABILITY

As described in the embodiments, the human body detector for seat of the invention brings about the following effects.

That is, since the vibration detection means is disposed in part of the seat so that its existence may not be felt by the human body seated on the seat and detects the vibration of the human body, the degree of freedom of constitution of the vibration detection means may be increased, and therefore the human body detecting means capable of detecting the human body securely with little effect on the comfort of sitting can be presented. Besides, since the seat pad protects from various stresses such as large force from the sitting surface on the vibration detection means, water spilled on the seat, or effect of heat of lit cigarette, the human body detector for seat rarely falling in trouble can be presented.

Moreover, since the signal processing means has plural filter means for dividing the output signal of the vibration detection means and issuing plural signals differing in the frequency components, it is possible to present a human body detector for seat capable of detecting the human body securely without impeding the comfort of sitting even in the vibrating environment such as the seat for automobile.

Also, since the vibration detection means is fixed to the seat spring, as far as the shape is proper, the vibration detection means may be disposed at this position without impeding the comfort of sitting, and the degree of freedom of design is further enhanced for disposing the vibration detection means on the seat.

Also, since the vibration detection means is disposed in contact with the bottom of the seat pad, the comfort of sitting is not impaired even in the seat without seat spring, and it may be only adhered to the back side of the seat pad, so that the human body detector for seat capable of mounting easily on the seat is presented.

The band element is fixed in part of the seat frame so as to generate a tension corresponding to the load received from the seat pad, and therefore the vibration of the seat pad is securely transmitted to the band element, and to the vibration detection means, the vibrations from both seat pad and band element contacting therewith are efficiently transmitted, and the human body detector for seat of high sensitivity is presented.

Moreover, the band element is fixed in part of the seat spring so as to generate a tension corresponding to the load received from the seat pad, and therefore the vibration of the seat pad is securely transmitted to the band element, and to the vibration detection means, the vibrations from both seat pad and band element contacting therewith are efficiently transmitted, and the human body detector for seat of high sensitivity is presented.

A tension is applied to the piezoelectric element from the tension applying unit, and the intrinsic piezoelectric performance of the piezoelectric element can be utilized, and moreover if its vibration is suppressed by the friction between the seat pad and seat frame, the vibration is transmitted efficiently, and the sensitivity of the piezoelectric element to the vibration is enhanced, so that the human body detector for seat of high sensitivity is presented.

The tension controller limits the tension applied to the piezoelectric element so that any tension over the predetermined value may not be applied to the piezoelectric element, and therefore lowering of sensitivity or breakdown of the piezoelectric element may not occur due to application of excessive tension to the piezoelectric element by the impact of seating, so that the human body detector for seat of high sensitivity and low incidence of troubles is presented.

Since the tension controller is composed of a material longer in dimension than the piezoelectric element and smaller in extension than the piezoelectric element, the tension applied to the piezoelectric element can be controlled by a simple and inexpensive constitution, so that the human body detector for seat of high sensitivity and low incidence of troubles due to breakdown of piezoelectric element or the like may be presented.

Moreover, since the tension controller is composed of an elastic material for coupling the piezoelectric element with the seat frame or seat spring, a high dimensional precision is not required when molding, and the tension applied to the piezoelectric element can be controlled by a simple and inexpensive constitution, so that the human body detector for seat of high sensitivity and low incidence of troubles due to breakdown of piezoelectric element or the like may be presented.

The vibration detection means is composed of a vibration detector and a buffer, and the vibration detector is held between the bottom of the seat pad and the buffer, and therefore unnecessary vibration from other than the sitting surface of the seat transmitted from the seat frame or the like is absorbed by the buffer and then transmitted to the vibration detection means, so that the vibration detection means can selectively receive the vibration from the seat necessary for detecting the human body on the seat, thereby presenting the human body detector for seat easy in mounting on the seat and high in sensitivity.

The vibration detection means is composed of a vibration detector and a buffer, and the vibration detector is fixed on the buffer, and the side of the buffer for fixing the vibration detection means is fixed in contact with the bottom of the seat pad of the seat, and therefore the vibration detection means may be easily fitted to the seat, and unnecessary vibration from other than the sitting surface of the seat transmitted from the seat frame or the like is absorbed by the buffer and then transmitted to the vibration detection means, so that the vibration detection means can selectively receive the vibration from the seat necessary for detecting the human body on the seat, thereby presenting the human body detector for seat easy in mounting on the seat and high in sensitivity.

The vibration detector is fixed on the surface of the buffer, and the side of the buffer for fixing the vibration detector is disposed in contact with the bottom of the seat pad of the seat, and is fixed to the seat frame for holding the seat pad of the seat or the seat spring coupled to the seat frame, and therefore the vibration detection means can be easily fitted to the seat, and the difference of the transmitted signals is increased between when the human body is seated on the seat and when nothing is present on the seat, so that the human body detector for seat easy in installation in the seat and high in sensitivity may be presented.

The buffer has a space for allowing the vibration detector to vibrate, and the vibration of the vibration detector by the vibration of human body transmitted from the seat pad is not impeded, and unnecessary vibration from other than the sitting surface transmitted from the seat frame is not transmitted directly to the vibration detector through the space in the buffer, but is transmitted after being attenuated, so that the vibration detection means can selectively receive the vibration from the sitting surface necessary for detecting the human body on the seat, thereby presenting the human body detector for seat of high sensitivity.

The buffer has a recess on the surface, and the vibration detector is fixed at the position facing the recess at the opposite side of the recess side, and the side of the buffer for fixing the vibration detector is disposed in contact with the seat pad of the seat together with the vibration detector, and therefore the vibration of the vibration detector due to vibration of the human body transmitted from the seat pad is not impeded, and the unnecessary vibration from other than the sitting surface transmitted from the seat frame is not directly transmitted to the vibration detector but is transmitted after being attenuated by the recess of the buffer, so that the vibration detection means can selectively receive the vibration from the sitting surface necessary for detecting the human body on the seat, thereby presenting the human body detector for seat of high sensitivity.

Alternatively, the buffer has a through-hole, and the vibration detector is disposed to cover the through-hole of the buffer, and therefore the vibration of the vibration detector due to vibration of the human body transmitted from the seat pad is not impeded, and the unnecessary vibration from other than the sitting surface transmitted from the seat frame is not directly transmitted to the vibration detector but is transmitted after being attenuated by the through-hole of the buffer, so that the vibration detection means can selectively receive the vibration from the sitting surface necessary for detecting the human body on the seat, thereby presenting the human body detector for seat of high sensitivity.

Since the buffer has plural spaces in the vibrating area of the vibration detector, the vibration of the vibration detector due to vibration of the human body transmitted from the seat pad is not impeded, and the unnecessary vibration from other than the sitting surface transmitted from the seat frame is not directly transmitted to the vibration detector but is transmitted after being attenuated by the plural spaces of the buffer, so that the vibration detection means can selectively receive the vibration from the sitting surface necessary for detecting the human body on the seat, thereby presenting the human body detector for seat of high sensitivity. Moreover, the thickness of the buffer between the plural spaces supports the vibration detector, and the vibration detector is not peeled off the seat pad, so that the human body detector for seat low in incidence of troubles can be presented.

The buffer is not uniform in structure, but the contacting side of the vibration detection means is more likely to absorb the vibration than its opposite side, and therefore the unnecessary vibration from other than the sitting surface transmitted from the seat frame is absorbed by the portion of the buffer more likely to absorb the vibration, and is attenuated and transmitted to the vibration detection means, and therefore the vibration detection means can selectively receive the vibration from the sitting surface necessary for detecting the human body on the seat, thereby presenting the human body detector for seat of high sensitivity.

The buffer is composed of at least two or more different materials, and the material of the side for fixing the vibration detection means is more likely to absorb the vibration than its opposite side, and therefore the unnecessary vibration from other than the sitting surface transmitted from the seat frame is absorbed by the portion of the buffer more likely to absorb the vibration, and is attenuated and transmitted to the vibration detection means, and therefore the vibration detection means can selectively receive the vibration from the sitting surface necessary for detecting the human body on the seat, thereby presenting the human body detector for seat of high sensitivity.

The buffer is composed of a foamed material, and the foam density of the side for fixing the vibration detection means is smaller than the foam density of the material of its opposite side, and therefore the unnecessary vibration from other than the sitting surface transmitted from the seat frame is absorbed by the portion of the buffer more likely to absorb the vibration, and is attenuated and transmitted to the vibration detection means. Therefore the vibration detection means can selectively receive the vibration from the sitting surface necessary for detecting the human body on the seat, thereby presenting the human body detector for seat of high sensitivity.

The buffer is composed of materials differing in hardness, and the side for contacting with the vibration detector is higher in hardness than its opposite side, and therefore the unnecessary vibration from other than the sitting surface transmitted from the seat frame is absorbed by the portion of the buffer more likely to absorb the vibration, and is attenuated and transmitted to the vibration detection means. Therefore the vibration detection means can selectively receive the vibration from the sitting surface necessary for detecting the human body on the seat, thereby presenting the human body detector for seat of high sensitivity.

What is claimed is:

1. A human body detector for a seat having a top surface above padding, said detector comprising:
    vibration detection means for detecting vibrations;
    signal processing means for processing the output of said vibration detection means; and
    judging means for judging presence or absence of a human body on said seat by the output of said signal processing means;
    said vibration detection means is disposed below said padding and a sufficient distance from a top surface of said seat so that a reactive force of said vibration detection means reaching said surface, to a human body seated on said seat is substantially zero.

2. A human body detector for seat of claim 1, wherein the signal processing means has plural filter means for dividing the output signal of the vibration detection means into plural signals differing in frequency components and issuing.

3. A human body detector for seat of claim 1, wherein the seat has a seat spring, and the vibration detection means is disposed as being fixed to said seat spring.

4. A human body detector for seat of claim 1, wherein said seat has a seat pad, and the vibration detection means is disposed in contact with the bottom of said seat pad.

5. A human body detector for seat of claim 4, wherein the seat has a seat frame for holding the seat pad, the vibration detection means comprises a piezoelectric element for generating an electric charge by external force and a tension applying unit for applying a tension to said piezoelectric element, and said tension applying unit couples between said piezoelectric element and said seat frame, so that a tension depending on the load from said seat pad is applied to said piezoelectric element.

6. A human body detector for seat of claim 5, wherein the vibration detection means includes a tension controller for limiting the tension applied to the piezoelectric element.

7. A human body detector for seat of claim 6, wherein the tension controller is composed of a member longer in dimension than the piezoelectric element and smaller in extension than said piezoelectric element, and its both ends are coupled to both ends of said piezoelectric element.

8. A human body detector for seat of claim 6, wherein the tension controller is composed of an elastic member for coupling the end of the piezoelectric element and the seat frame.

9. A human body detector for seat of claim 6, wherein the tension controller is composed of an elastic member for coupling the end of the piezoelectric element and the seat spring.

10. A human body detector for seat of claim 4, wherein the seat has a seat spring for holding the seat pad, the vibration detection means comprises a piezoelectric element for generating an electric charge by external force and a tension applying unit for applying a tension to said piezoelectric element, and said tension applying unit couples between said piezoelectric element and said seat spring, so that a tension depending on the load from said seat pad is applied to said piezoelectric element.

11. A human body detector for seat of claim 10, wherein the vibration detection means includes a tension controller for limiting the tension applied to the piezoelectric element.

12. A human body detector for seat of claim 4, wherein the vibration detection means is composed of a vibration detector for issuing an electric signal depending on the applied vibration, and a buffer for absorbing the applied vibration, and said vibration detector is held between the bottom of the seat pad and said buffer.

13. A human body detector for seat of claim 12, wherein the vibration detector is fixed on the surface of the buffer, and the side for fixing the vibration detector of said buffer is fixed to the bottom of the seat pad together with said vibration detector.

14. A human body detector for seat of claim 12, wherein the seat has a seat frame for holding the seat pad, the vibration detector is fixed to the surface of the buffer, and the side for fixing the vibration detector of said buffer is disposed so that said vibration detector may contact with the seat pad, and is also disposed on said seat frame.

15. A human body detector for seat of claim 12, wherein the seat has a seat spring for holding the seat pad, the vibration detector is fixed to the surface of the buffer, and the side for fixing the vibration detector of said buffer is disposed so that said vibration detector may contact with the seat pad of the seat, and is also disposed on said seat spring.

16. A human body detector for seat of any one of claims 12, 13, 14 and 15 wherein the buffer has a space for allowing the vibration detector fixed on its surface to vibrate, thereby composing sensitivity enhancing means.

17. A human body detector for seat of claim 16, wherein the space is a recess formed at one side of the buffer, the vibration detector is disposed at a position facing said recess at the opposite side of said recess of said buffer, and the side for disposing said vibration detector of said buffer is disposed in contact with the bottom of the seat pad of the seat together with said vibration detector.

18. A human body detector for seat of claim 17, wherein the space includes plural spaces.

19. A human body detector for seat of claim 16, wherein the space is a through-hole provided in the buffer, the vibration detector is disposed so as to cover said through-hole of said buffer, and the side for disposing said vibration detector of said buffer is disposed in contact with the bottom of the seat pad of the seat together with said vibration detector.

20. A human body detector for seat of claim 19, wherein the space includes plural spaces.

21. A human body detector for seat of claim 19, wherein the space includes plural spaces.

22. A human body detector for seat of claim 16, wherein the space includes plural spaces.

23. A human body detector for seat of claim 16, wherein the buffer is not uniform in structure, but is constituted so that the side for contracting with the vibration detector is more unlikely to absorb the vibration than its opposite side, thereby composing sensitivity enhancing means.

24. A human body detector for seat of any one of claims 12, 13, 14 and 15 wherein the buffer is not uniform in structure, but is constituted so that the side for contracting with the vibration detector is more unlikely to absorb the vibration than its opposite side, thereby composing sensitivity enhancing means.

25. A human body detector for seat of claim 24, wherein the buffer is composed of at least two different materials, and the side for contacting with the vibration detector is composed of a material more likely to absorb the vibration than the opposite side.

26. A human body detector for seat of claim 24, wherein the buffer is composed of a foamed material, and the side for contracting with the vibration detector is smaller in the foam density than the opposite side, thereby composing sensitivity enhancing means.

27. A human body detector for seat of claim 24, wherein the buffer is composed of materials difference in hardness, and the side for contacting with the vibration detector is higher in hardness than the opposite side, thereby composing sensitivity enhancing means.

28. A human body detector for seat of claim 1, wherein the seat has a seat pad and a seat frame for holding said seat pad, the vibration detection means is disposed in a band element installed beneath said seat pad, and said band element is coupled to said seat frame, so that a tension is applied depending on the load from the seat pad.

29. A human body detector for seat of claim 1, wherein the seat has a seat pad and a seat spring for holding said seat pad, the vibration detection means is disposed in a band element installed beneath said seat pad, and said band element is coupled to said seat spring, so that a tension is applied depending on the load from the seat pad.

* * * * *